US010416278B2

(12) United States Patent
Bovard et al.

(10) Patent No.: US 10,416,278 B2
(45) Date of Patent: Sep. 17, 2019

(54) RADIO RECEIVER FOR DETERMINING LOCATION OF A SIGNAL SOURCE

(71) Applicant: Concentric Real Time, LLC, Ellicott City, MD (US)

(72) Inventors: Reese S. Bovard, Ellicott City, MD (US); Eric J. Jensen, Westminster, MD (US)

(73) Assignee: Concentric Real Time, LLC, Ellicott City, MD (US)

( * ) Notice: Subject to any disclaimer, the term of this patent is extended or adjusted under 35 U.S.C. 154(b) by 0 days.

(21) Appl. No.: 15/542,548

(22) PCT Filed: Feb. 4, 2016

(86) PCT No.: PCT/US2016/016581
§ 371 (c)(1),
(2) Date: Jul. 10, 2017

(87) PCT Pub. No.: WO2016/130399
PCT Pub. Date: Aug. 18, 2016

(65) Prior Publication Data
US 2018/0011162 A1 Jan. 11, 2018

Related U.S. Application Data

(60) Provisional application No. 62/113,700, filed on Feb. 9, 2015.

(51) Int. Cl.
*H04W 4/02* (2018.01)
*G01S 5/06* (2006.01)
(Continued)

(52) U.S. Cl.
CPC ............. *G01S 5/06* (2013.01); *G01S 5/12* (2013.01); *G01S 5/14* (2013.01); *G01S 19/01* (2013.01); *G01S 19/42* (2013.01); *H04W 64/00* (2013.01)

(58) Field of Classification Search
CPC ....... H04W 4/02; H04W 4/021; H04W 4/023; H04W 4/024; H04W 4/029; H04W 64/00;
(Continued)

(56) References Cited

U.S. PATENT DOCUMENTS 3,864,681 A * 2/1975 Olive ..................... G01S 3/48
342/457
5,319,191 A * 6/1994 Crimmins .............. H04B 10/60
250/214 R
(Continued)

FOREIGN PATENT DOCUMENTS

CA 2793331 A1 4/2013
EP 2735883 A1 5/2014
(Continued)

OTHER PUBLICATIONS

International Search Report and Written Opinion dated Jun. 10, 2016 for PCT//US16/016581.
(Continued)

*Primary Examiner* — Jean A Gelin
(74) *Attorney, Agent, or Firm* — Fox Rothschild LLP; Carol E. Thorstad-Forsyth

(57) ABSTRACT

Systems and methods for determining an accurate location of a signal's source of transmission. The methods involve: demodulating a detected carrier signal modulated with a Pseudo Noise ("PN") code sequence to obtain an original information-bearing signal therefrom; computing time delay offsets using correlations of PN code windows for each symbol of the original information-bearing signal; determining a high accuracy Time Of Arrival ("TOA") of the detected carrier signal using the time delay offsets; and using the high accuracy TOA to determine an accurate location of the original information-bearing signal's source of transmission.

14 Claims, 25 Drawing Sheets

(51) Int. Cl.
*G01S 19/42* (2010.01)
*G01S 5/14* (2006.01)
*G01S 5/12* (2006.01)
*G01S 19/01* (2010.01)
*H04W 64/00* (2009.01)

(58) Field of Classification Search
CPC ... H04W 64/003; H04W 84/12; H04W 84/14; H04W 88/085; H04W 88/08; G01S 19/01; G01S 19/42; G01S 5/06; G01S 5/12; G01S 5/14
See application file for complete search history.

(56) References Cited

U.S. PATENT DOCUMENTS

| | | | |
|---|---|---|---|
| 5,943,606 A | 8/1999 | Kremm et al. | |
| 6,094,450 A * | 7/2000 | Shockey | H04B 1/707 329/304 |
| 6,353,412 B1 | 3/2002 | Soliman | |
| 6,593,877 B2 | 7/2003 | Peeters et al. | |
| 8,174,439 B2 | 5/2012 | Torimoto et al. | |
| 8,618,978 B2 | 12/2013 | Torimoto et al. | |
| 2003/0008663 A1 | 1/2003 | Stein et al. | |
| 2004/0027281 A1 | 2/2004 | Akopian et al. | |
| 2004/0057505 A1 | 3/2004 | Valio | |
| 2007/0176749 A1 | 8/2007 | Boyd | |
| 2008/0252516 A1 | 10/2008 | Ho et al. | |
| 2009/0033462 A1 * | 2/2009 | Kitayoshi | G06K 19/0723 340/10.1 |
| 2009/0149202 A1 * | 6/2009 | Hill | G01S 5/0289 455/456.6 |
| 2009/0295631 A1 | 12/2009 | Wu et al. | |
| 2010/0260207 A1 * | 10/2010 | Simmons | G01S 5/14 370/503 |
| 2010/0309051 A1 * | 12/2010 | Moshfeghi | H04W 4/029 342/378 |
| 2012/0032854 A1 * | 2/2012 | Bull | G01S 5/0215 342/450 |
| 2015/0036724 A1 | 2/2015 | Van Dierendonck et al. | |
| 2015/0139360 A1 * | 5/2015 | Visser | H04L 27/361 375/298 |
| 2016/0146922 A1 * | 5/2016 | Moshfeghi | H04W 64/006 455/456.6 |
| 2018/0035256 A1 * | 2/2018 | Prevatt | H04W 4/023 |
| 2018/0295470 A1 * | 10/2018 | Markhovsky | G01S 13/767 |

FOREIGN PATENT DOCUMENTS

| | | |
|---|---|---|
| EP | 2811320 A1 | 12/2014 |
| RU | 2013785 C1 | 5/1994 |
| WO | 01/14902 A1 | 3/2001 |

OTHER PUBLICATIONS

Gregoire, Y., et al., "MEOSAR New GNSS Role in Search and Rescue," Dec. 1, 2014, pp. 57-69, XP055376064.
Weinberg, A., et al., "A Novel Concept for a Satellite-Based Maritime Search and Rescue System," IEEE Transactions on Vehicular Technology, IEEE Service Center, vol. 26, No. 3, Aug. 1, 1977, pp. 258-269, ISSN: 0018-9545.

* cited by examiner

RADIO RECEIVER FOR DETERMINING LOCATION OF A SIGNAL SOURCE

CROSS-REFERENCE TO RELATED APPLICATIONS

This application claims priority to International Patent Application No. PCT/US2016/016581, filed on Feb. 4, 2016, and U.S. Patent Application No. 62/113,700, filed Feb. 9, 2015. The contents of the above applications are incorporated by reference in their entirety.

FIELD OF THE INVENTION

This document relates generally to radio receivers. More particularly, this document relates to systems and methods for providing a radio system capable of determining a source location of a signal with high accuracy.

BACKGROUND

A Software Defined Radio ("SDR") is a programmable and reconfigurable system that provides a flexible and scaleable architecture. Such a radio system typically supports many different communication waveforms, thus facilitating improved communications among users, such as government agencies and government services. An SDR typically comprises a single hardware platform that can carry out many functions based on the software applications loaded therein. The SDR uses the installed software applications to perform radio signal processing functions. Frequency tuning, filtering, synchronization, encoding and modulation are performed in software on high-speed reprogrammable devices (e.g., Digital Signal Processors ("DSPs"), Field Programmable Gate Arrays ("FPGAs") and General Purpose Processors ("GPPs")).

At the center of SDR technology is the software architecture on which the radios must be built and communication protocols implemented. Many proprietary architectures exist, but to ensure portability and interoperability of the protocols on the different radios, an open architecture was developed. The open architecture is referred to as a Software Communications Architecture ("SCA"). SCA comprises a set of specifications describing the interaction between the different software and hardware components of a radio and providing software commands for their control. Accordingly, the SCA is an open architecture framework that specifies how hardware and software components are to interoperate so that different manufacturers and developers can readily integrate the respective components into a single device.

SUMMARY OF THE INVENTION

The present document concerns systems and methods for determining an accurate location of a signal's source of transmission. The methods comprise: demodulating, by a receiver of a communication device, a detected carrier signal modulated with a Pseudo Noise ("PN") code sequence to obtain an original information-bearing signal therefrom; computing, by the receiver, time delay offsets using correlations of PN code windows for each symbol of the original information-bearing signal; determining, by the receiver, a high accuracy Time Of Arrival ("TOA") of the detected carrier signal using the time delay offsets; and using, by the receiver, the high accuracy TOA to determine an accurate location of the original information-bearing signal's source of transmission.

In some scenarios, the demodulating comprises: detecting a phase deviation from the detected carrier signal; removing the phase deviation from the detected carrier signal; performing early/late gate tracking to recover symbol timing phase of the detected carrier signal; and performing demodulation of the detected carrier signal using the recovered symbol timing thereof to extract the original information-bearing signal therefrom.

In those or other scenarios, the method further comprise: curve fitting the time delay offsets to construct a fitted curve that has a best fit to a series of data points defining the time delay offsets; and extrapolating unknown time delay offsets using the fitted curve. The high accuracy TOA is determined using the unknown time delay offsets that were extrapolated using the fitted curve. The high accuracy TOA is refined by: determining a satellite position; computing an atmospheric and relativistic delay that affected the detected carrier signal during transmission thereof using the satellite position; and applying the atmospheric and relativistic delay to the high accuracy TOA so as to generate a refined TOA. The refined TOA is then used to determine an accurate location of the original information-bearing signal's source.

In those or other scenarios, the high accuracy TOA is determined by: determining through signal detection, a coarse TOA and a coarse Frequency Of Arrival ("FOA") for a sample of the original information-bearing signal; performing a multi-stage down conversion process using at least the samples associated with the coarse FOA at the point of detection to remove a Doppler effect from the original information-bearing signal; cross correlating a first set of samples from the original information-bearing signal to a second set of samples from a local copy of the PN code sequence to determine a cross correlation peak; using the cross correlation peak to find a first temporal peak center for a pulse for each symbol of the original information-bearing signal; using the correlation peak to find a first temporal peak center for each symbol of the original information-bearing signal; using the first temporal peak center to obtain a set of first estimated symbols; using the set of first estimated symbols to obtain a value representing twice a center frequency; and down converting the set of samples using the center frequency to remove any remaining trace of Doppler effect from the original information-bearing signal.

The high resolution TOA process comprises: obtaining a correlation peak by cross correlating a third set of samples obtained from the original information-bearing signal with the removed Doppler effect to a fourth set of samples obtained from the local copy of the PN code sequence; using the second temporal peak center to obtain a set of second estimated symbols; generating a curve fit using the set of second estimated symbols; and determining the high accuracy TOA by dividing an intercept value of a sample-by-sample rate, where the intercept value is obtained using the curve fit and the samples associated with the coarse TOA.

DESCRIPTION OF THE DRAWINGS

Embodiments will be described with reference to the following drawing figures, in which like numerals represent like items throughout the figures, and in which.

DETAILED DESCRIPTION OF THE INVENTION

Figure 1:
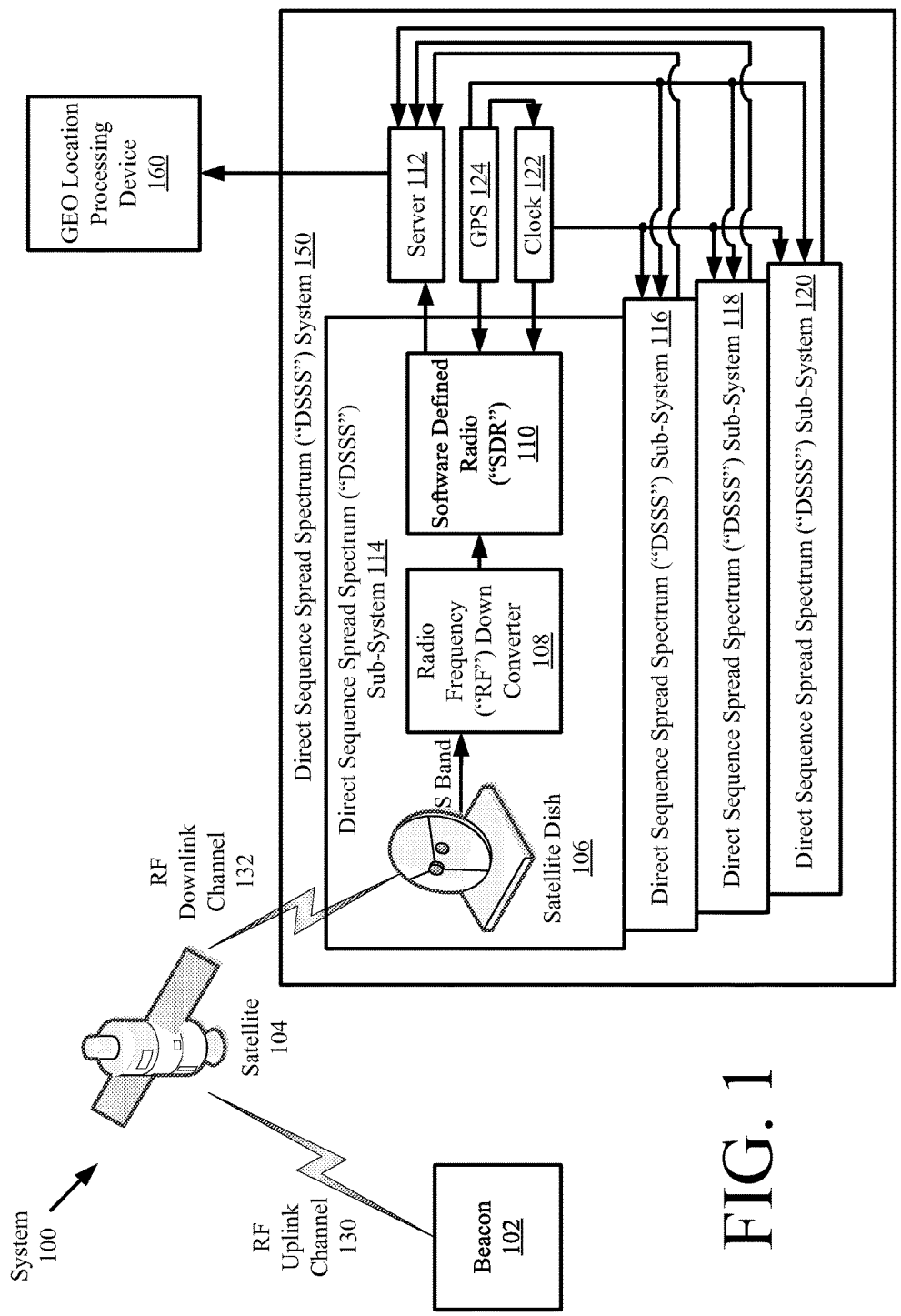
FIG. 1 comprises a schematic illustration of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution implements methods for computing a TOA and an FOA of a signal transmitted from a beacon, relayed off a satellite and received at a ground station. The terms "Time Of Arrival" and "TOA", as used herein, refers to the travel time of a signal sent from a first communication device (e.g., a beacon) and received at a second communication device (e.g., a ground station). The terms "Frequency Of Arrival" and "FOA", as used herein, refers to the frequency at which a signal is received by a remote ground station. The accuracy of the TOA is directly proportional to the accuracy of the beacon location estimate. Therefore, the present solution provides a novel technique to compute a high accuracy TOA for the purpose of improving the beacon location estimate.

In some scenarios, the novel technique is employed in an SDR receiver. The SDR receiver is configured to perform signal detection (e.g., block 304 of FIG. 3), signal demodulation (e.g., operational block 306 of FIG. 3), and obtain high accuracy TOA measurements in a dynamic Doppler environment (e.g., operational block 308 of FIG. 3). The particulars of each of these operations will be described in detail below. Notably, in the present solution, one hundred (100) ns measurement accuracy is possible due to the combination of signal processing and access to atmospheric data and satellite ephemeris. The accuracy is a three (3) orders of magnitude improvement over existing search and rescue receivers.

The signal detection is done using a Fast Fourier Transform ("FFT") correlation process that allows for signal detection over a range of Doppler frequencies. A coarse TOA is computed during the signal detection process.

Signal demodulation is achieved by: (1) detecting a phase deviation from a detected carrier signal (modulated with a Pseudo Noise ("PN") code sequence) due to satellite movement; (2) removing the phase deviation from the detected carrier signal; (3) performing early/late gate tracking to recover symbol timing phase of the detected carrier signal using an early/late gate algorithm; and (4) performing demodulation of the detected carrier signal using the recovered symbol timing thereof to extract the original information-bearing signal therefrom. Early/late gate algorithms are well known in the art, and therefore will not be described herein. Any known or to be known early/late gate algorithm can be used herein without limitation. The fundamental goal of the early/late gate tracking is to facilitate symbol synchronization so that a pulse can be sampled at its peak value as described below. There are several ways of demodulation which can be employed herein depending on how parameters of a baseband signal (such as amplitude, frequency or phase) are transmitted in the carrier signal. Any known or to be known demodulation technique can be employed herein that is suitable for demodulating a given modulated carrier wave.

The high accuracy TOA is obtained by: (1) computing time delay offsets using correlations of PN code windows for each symbol of the original information-bearing signal; (2) curve fitting the time delay offsets to construct a fitted curve (or mathematical function) that has the best fit to a series of data points defining the time delay offsets; (3) extrapolating unknown time delay offsets using the fitted curve; and (4) determining a high accuracy TOA of the detected modulated carrier signal using the time delay offsets and/or the unknown time delay offsets extrapolated using the fitted curve. The terms "pseudo noise code window" and "PN code window", as used herein, refers to a sequence of n bits contained in the pseudo noise code, where n is an integer. Two PN code windows may comprise at least one same bit (i.e., comprise overlapping portions of the PN code) or none of the same bits (i.e., comprise non-overlapping portions of the PN code). The curve fitting can include, but is not limited to, interpolation and/or smoothing. The curve enables the ability to infer values of a function where no data is available. The extrapolating involves using the fitted curve beyond the range of observed data to estimate the value of a variable (e.g., an unknown time delay offset value for a first symbol) on the basis of its relationship with another variable (e.g., a known time delay offset of at least a second symbol).

Further refinement of the high accuracy TOA is accomplished by: (1) determining the satellite position; (2) computing the atmospheric and relativistic delay that affected the detected modulated carrier signal during transmission thereof using the satellite position; and (3) applying the atmospheric and relativistic delay delays to the high accuracy TOA.

Referring now to FIG. 1, there is provided a schematic illustration of an exemplary system 100 that is useful for understanding the present invention. System 100 comprises a beacon 102, a satellite 104, a Direct Sequence Spread Spectrum ("DSSS") system 150, and a GEO location processing device 160. The beacon 102 can include, but is not limited to, a hand-held communication device, a ship mounted communication device, and/or an aircraft mounted communication device. In all scenarios, the beacon 102 is configured to transmit an alert signal signifying a distress condition.

When an alert signal is transmitted from the beacon 102 as a DSSS signal, it is received at the satellite 104 on a Radio Frequency ("RF") uplink channel 130. The satellite 104 re-transmits the alert signal unmodified (bent pipe) using an RF downlink channel 132. DSSS signals are well known in the art, and therefore will not be described in detail herein. Still, it should be understood that, in some scenarios, the DSSS signal is formed by multiplying a high rate Pseudo Noise ("PN") code with a lower rate data signal. PN codes are well known in the art, and thus will not be described herein. Any known or to be known PN code can be used herein without limitation. The multiplying process results in spreading the data signal energy over a wider bandwidth than is needed by the low rate signal. The purpose of this spreading is to allow the coexistence of the new signal with other signals with minimal interferences therebetween.

The DSSS signal is then received by the DSSS system 150. The DSSS system 150 processes the received DSSS signal for determining a TOA and/or an FOA therefore. The novel manner in which the TOA and/or FOA are determined will become more evident as the discussion progresses. The TOA and/or FOA are(is) then stored for subsequent use by the GEO location processing device 160 to determine an accurate location of the beacon 102 relative to the DSSS system 150.

As shown in FIG. 1, the DSSS system 150 comprises a plurality of DSSS sub-systems 114, 116, 118, 120. The present invention is not limited in this regard. The DSSS system 150 can include any number of DSSS sub-systems as is required for a particular application. For example, the DSSS system 150 can include a single DSSS sub-system or N DSSS sub-systems, where N is an integer. However, the accuracy of the beacon 102 location increases as the number of redundant DSSS sub-systems increases.

In all cases, timing components 122 and 124 provide an accurate time base for the DSSS sub-system(s). For example, the timing components include a GPS receiver 124 and a clock 122. The GPS receiver 124 provides a one (1) pulse per second signal that is accurate to fifty (50) ns of Coordinated Universal Time ("UTC") and a ten (10) MHz reference signal that has very low phase noise and is frequency stable to point zero one parts per billion (1 e-11 or 0.01 Parts Per Billion). In addition, the clock 122 (e.g., a network time server) provides a time tag that is accurate to ten (10) ms. The combination of these two elements 122 and 124 provides a fifty (50) ns accurate time reference for the DSSS sub-system(s). The present invention is not limited to the particulars of this example. Still, it should be understood that any known or to be known time referencing scheme can be used herein without limitation, provided that the time reference is equal to or less than fifty (50) ns from the actual UTC time and is provided coherently to the DSSS sub-systems 114-120.

Each of the DSSS sub-systems comprises a satellite dish 106, an RF down converter 108, and an SDR 110. RF down converters are well known in the art, and therefore will not be described herein. Any known or to be known RF down converter can be used herein which is configured to at least receive signals in either an S band or an L band. In some scenarios, the RF down converter 108 filters, amplifies and down converts the received DSSS signal to an Intermediate Frequency ("IF") signal (e.g., a 70 MHz IF signal). The IF signal is then provided to the SDR 110 for digital processing. The RF down converter 108 and SDR 110 are driven by the GPS receiver 124 time reference to maintain coherence.

Figure 2:
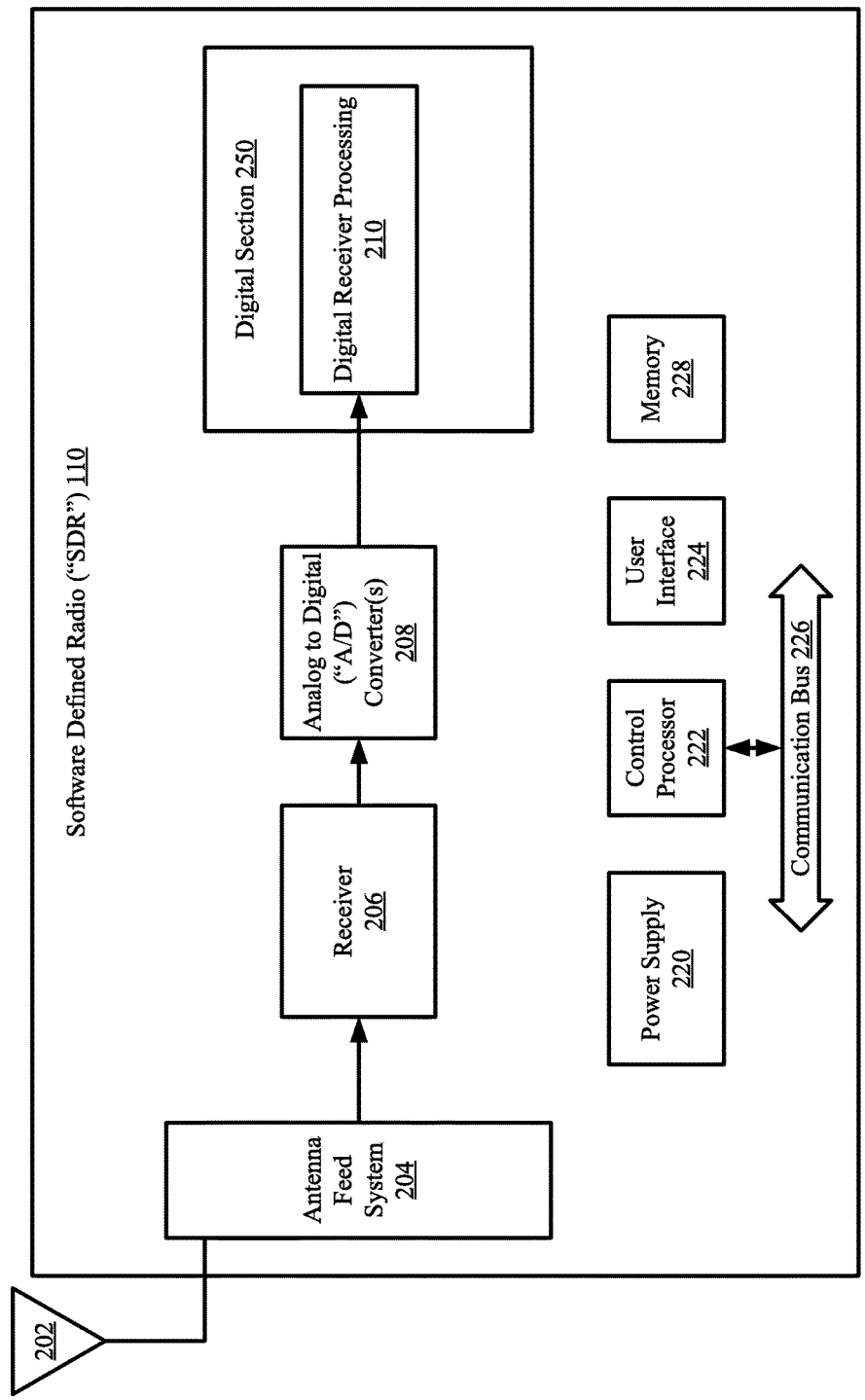
FIG. 2 comprises a schematic illustration of an exemplary architecture for an SDR shown in FIG. 1.

A schematic illustration of an exemplary architecture for the SDR 110 is provided in FIG. 2. As shown in FIG. 2, SDR 110 includes an antenna 202 that is coupled to an antenna feed system 204 for routing received signals to a receiver 206. Receiver 206 can include any one of a wide variety of broadband receiver systems as are commonly known in the field of SDRs. In this regard, the receiver 206 can include, but is not limited to, one or more stages of RF amplifiers and filters. Depending on the design of the SDR system, the receiver 206 can also include one or more mixing stages, IF amplifiers and IF filter stages. One or more RF or IF output channels are communicated from the receiver 206 to one or more Analog to Digital ("A/D") converters 208. Once the incoming analog signal has been converted to a digital signal by the A/D converter(s) 208, it is passed to the digital section 250 of the SDR 110 for any necessary receiver digital signal processing.

Receiver digital signal processing is performed in digital receiver processing unit 210 of the digital section 250. The digital receiver processing unit 210 is comprised of a programmable microprocessor, general purpose computer programmed with a set of instructions or any other electronic circuitry suitable for performing the functions as described herein. In some scenarios, the digital receiver processing unit 210 comprises a microprocessor programmed with a suitable set of instructions for performing the various functions described herein.

The receiver digital signal processing includes: frequency shifting an IF signal to a baseband signal (e.g., shift a signal's frequency from 70 MHz to 0 Hz); and filtering the baseband signal to remove duplicative products. The filtering can be achieved using a Finite Impulse Response ("FIR") filter. FIR filters are well known in the art, and therefore will not be described herein.

At the same time, the IF signal is down converted. The resulting samples are stamped with a time tag Epoch. The sample that occurs at the same instant as the current second (as defined by a time reference signal, such as a GPS 1 PPS signal) is attached to a time tag (e.g., the number of seconds since a given date, such as Jan. 1, 2012). Each subsequent sample is then offset by the inverse of the sample frequency.

Figure 3:
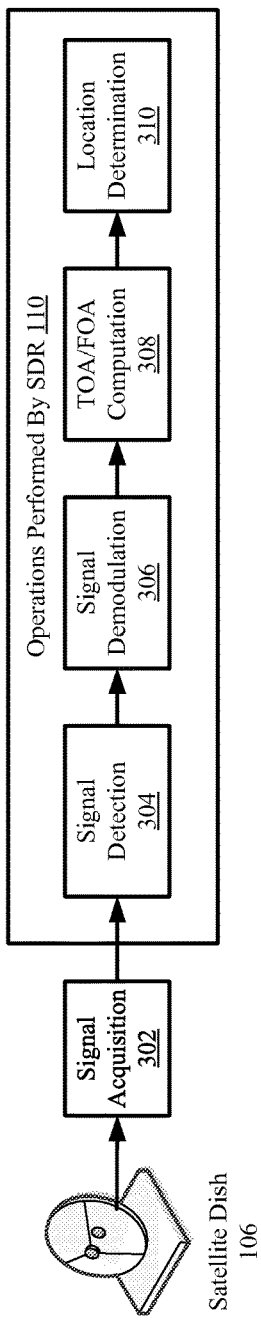
FIG. 3 comprises a schematic illustration outlining functional operations of signal processing performed by the SDR shown in FIGS. 1-2.

Once the signal is acquired at baseband during a signal acquisition 302, various other signal processing operations are performed by the SDR 110. As shown in FIG. 3, these operations involve: performing signal detection 304; performing signal demodulation 306; performing a TOA/FOA determination process 308; and performing location processing 310. Each of these operations 304-310 will be discussed in detail below.

The signal detection process 304 is performed by the digital receiver processing unit 210 using an FFT correlation process. The FFT correlation process allows for detection over a range of Doppler frequencies. The FFT correlation process involves: (a) computing a coarse TOA; (b) performing a sample-by-sample correlation of the baseband signal with a replica of the PN code sequence used to modulate the carrier signal; and (c) performing an FFT using the results of the sample-by-sample correlation. In step (a), the coarse TOA is computed by analyzing time information contained in the baseband signal to determine the travel time for the original information-bearing signal transmitted from the beacon (e.g., beacon 102 of FIG. 1) to the ground station (e.g., DSSS system 150 of FIG. 1). In step (b), the spread energy is collapsed into a narrow peak when the replica and the received carrier signal overlap in time. Since a satellite (e.g., satellite 104 of FIG. 1) is moving (i.e., it is not geostationary) and causes Doppler shifts in the carrier signal, the carrier signal cannot be shifted exactly to baseband without knowledge of the beacon position 102. For this reason, an FFT is employed after the sample-by-sample correlation which has the effect of revealing the peak at the actual resulting Doppler offset frequency.

When a successful sample-by-sample correlation is performed, the peak of a pulse for each symbol of the spread spectrum signal needs to be detected. The peak is detected using an exponential averaging of the FFT data. Each time an FFT is performed, the new FFT data is exponentially averaged and smoothed with the previous FFT's. This is a measure of the average ambient energy in the band. A threshold can be obtained by multiplying a constant value to the value of the average ambient energy. The threshold can then be used for peak detection. The detected peak is quantified as: (i) a sample offset (i.e., the number of samples from the most recent second); (ii) the frequency offset within the current FFT; and (iii) the magnitude of the peak. These values (i)-(iii) are then stored in a memory 228 for later use.

The detected peak and time-tagged baseband samples are then used in a subsequent signal demodulation process 306 by the SDR 110. The signal demodulation process 306 involves detecting and removing a residual frequency offset and a residual phase deviation from the signal. The residual frequency and phase offsets are detected by first de-spreading the signal. The de-spreading is achieved by: looking up an appropriate baseband sample given a time-tag and a sample offset; down converting the spread spectrum signal to 0 Hz using a frequency offset to remove Doppler; de-spreading the spread spectrum signal using small symbol size chunks of the replica of the baseband signal's PN code; and integrating oversampled de-spread samples to form a symbol. Once the de-spreading process is completed, the symbol is FFT'ed to determine a residual frequency offset. The residual frequency offset is removed from the signal by frequency shifting the signal to baseband. In addition, the residual phase deviation (due to satellite movement during the burst) is detected and removed. Thereafter, the above-described process is repeated for a next time-tagged baseband sample. Upon completing the previously described iterative process, the symbols are mapped into bits using a lookup table.

As noted above, the signal demodulation process 306 also involves performing early/late gate tracking and demodulation. The early/late gate tracking involves computing time delay offsets for each symbol. The time delay offsets are computed using early/late gate correlations of PN code windows for each symbol. More specifically, the results of the early/late gate correlations are curve fit and extrapolated. The result of the extrapolation is used to compute a high accuracy TOA (a refined version of the previously determined coarse TOA) during the TOA/FOA computation process 308.

During the signal demodulation process 306, each sub chunk of the PN code is correlated with a window of samples in the spread spectrum signal. This forms an early/late gate detection of each symbol and identifies the appropriate sample instant for a particular symbol by maximizing the energy. The energy is maximized by picking the maximum energy correlation shift. The maximum energy correlation shift is recorded for each symbol so that a set of relative time tags over the signal burst are recorded. The set of time tags can then be curve (linear or higher order depending on the dynamics of the satellites or transmitter) fit using the mean square error method. The burst TOA is the intercept of the function.

Once the message bits and TOA are computed, a further refinement to the TOA is accomplished during the TOA/FOA computation process 308. The refinement is achieved by: determining the satellite position; computing the atmospheric and relativistic delay that affected the detected modulated carrier signal during transmission thereof; and applying the atmospheric and relativistic delay to the high accuracy TOA. This can be performed using a freely available software package referred to as the GPSTookit®. The GPSToolkit® contains software algorithms that compute a satellite position, a relativistic effect and an Ionosphere delay when inputting the satellite ephemeris, time of day and location of a receiver.

In computing the uplink delay, the satellite group delay bias must be accounted for in order to predict the time of arrival at the satellite and in turn the high accuracy time of transmission. This is done by performing a calibration process using a known transmit position, receive position and the ephemeris of the satellites. The calibration process is performed to calculate the delays and to statistically determine the unknown delay of the satellite. The time of flight from the beacon (e.g., beacon 102 of FIG. 1) to the DSSS sub-system (e.g., DSSS sub-system 114 of FIG. 1) is calculated by calculating the satellite position using the SP3 ephemerides. The ionosphere and troposphere delays are calculated once the pierce point in the atmosphere of the signal's path is determined. The difference between the measured time and the predicted time yields the satellite group delay bias. A large sampling of the group delay bias is taken while a satellite is at an elevation above forty (40) degrees and preferably when the ionosphere delays are at a minimum. This is achieved by taking the samples when the sun's position is over the horizon of the region of the transmitter and receiver. At least a one hundred (100) ns measurement accuracy is possible due to the combination of signal processing and access to atmospheric data and satellite ephemeris. The accuracy is three (3) orders of magnitude improvement over existing Search and Rescue receivers.

As also shown in FIG. 2, the SDR 110 additionally includes a power supply 220 for providing power to the various digital and analog blocks that comprise the system. The SDR 110 can also include a control processor 222. Similar to the digital receiver processing unit 210, the control processor 222 can be comprised of a programmable microprocessor, general purpose computer programmed with a set of instructions or any other electronic circuitry suitable for performing the functions as described herein. In some scenarios, the control processor is a microprocessor programmed with a suitable set of instructions for performing the various functions described herein.

Control processor 222 includes data communications ports for communicating control signals to one or more component systems forming the SDR 110. The communications ports can be coupled to any suitable type of conventional computer data communication bus 226. The computer data communication bus 226 can be used to communicate control signals from the control processor 222 to one or more of the SDR subsystems as hereinafter described.

The control processor is also operatively coupled to a user interface 224. User interface 224 can be implemented using a display (not shown) for presenting a Graphical User Interface ("GUI"). The display can be a Liquid Crystal Display ("LCD") or any other display suitable for use on a mobile station. The display can be black and white or color. The user interface 224 also advantageously includes a user input device. The user input device can include a keypad, a touch pad, buttons, switches, sensors, and/or any other devices which can be used to receive user inputs.

The SDR architecture shown in FIG. 2 is exemplary. The present invention is not limited to that shown in FIG. 2. For example, in those or other scenarios, the SDR comprises a PC workstation hosting an FPGA/Analog Digital Converter ("ADC") card. The FPGA/ADC card digitizes and processes the received IF signals. The FPGA/ADC card can include, but is not limited to, a Pentek® Digital Receiver card which performs the following operations: digitizes signals at 200 MHz; timestamps data using a 1 PPS; and performs detection processing. The Pentek® Digital Receiver is installed in a PCI-e slot of the PC workstation, which provides a transparent interface between the registers in the FPGA and the PC workstation. The baseband samples and detections are passed to the PC workstation over the PCI-e interface. The PC workstation accepts the detections and baseband samples, dispreads and demodulates the signals, and presents the results to a location processor. The PC workstation creates an XML file with a specified format and copies the XML file to the appropriate directory in a mapped drive on the server 112. The present invention is not limited to the particulars of this example.

Signal Processing

As noted above, there is provided a schematic illustration outlining the functional operations of the signal processing performed by SDR 110. The functional operations include: acquisition operations represented by functional block 302; signal detection operations represented by functional block 304; signal de-spreading and demodulation operations represented by functional block 306; and TOA and/or FOA estimation operations represented by functional block 308. The TOA and/or FOA estimates are then used in location determination operations to determine the location of the beacon (e.g., beacon 102 of FIG. 1) relative to the DSSS system (e.g., DSSS system 150 of FIG. 1), as shown by functional block 310. The location determination operations are performed by a GEO location processing device (e.g., GEO location processing device 160 of FIG. 1).

The acquisition operations of functional block 302 generally involve: receiving digital samples from an RF down converter (e.g., RF down converter 108 of FIG. 1); and processing the digital samples to tune, filter and/or format the same so that the digital samples are at the appropriate rate for subsequent processing. The signal detection operations of functional block 304 generally involve: taking the baseband samples; performing the correlation function to collapse the spread energy into a narrow band Signal to Noise Ratio ("SNR") peak; comparing the SNR peak against an uncorrelated signal threshold; and creating detection packets consisting of sample of arrival counter and frequency of arrival index, when the peak exceeds the threshold. The signal de-spreading and demodulation operations of functional block 306 generally involve: accepting the detection packets; performing cluster processing to identify sub-peaks from a given burst; reducing the sets of peaks to a discrete set of detections; and serially processing the set of detections to de-spread and demodulate the signal. Additionally, time and frequency information is computed for each symbol during the signal de-spreading and demodulation operations of functional block 306. The TOA/FOA function 308 will curve fit the TOA and FOA estimates to determine a refined estimate.

Acquisition

Figure 4:
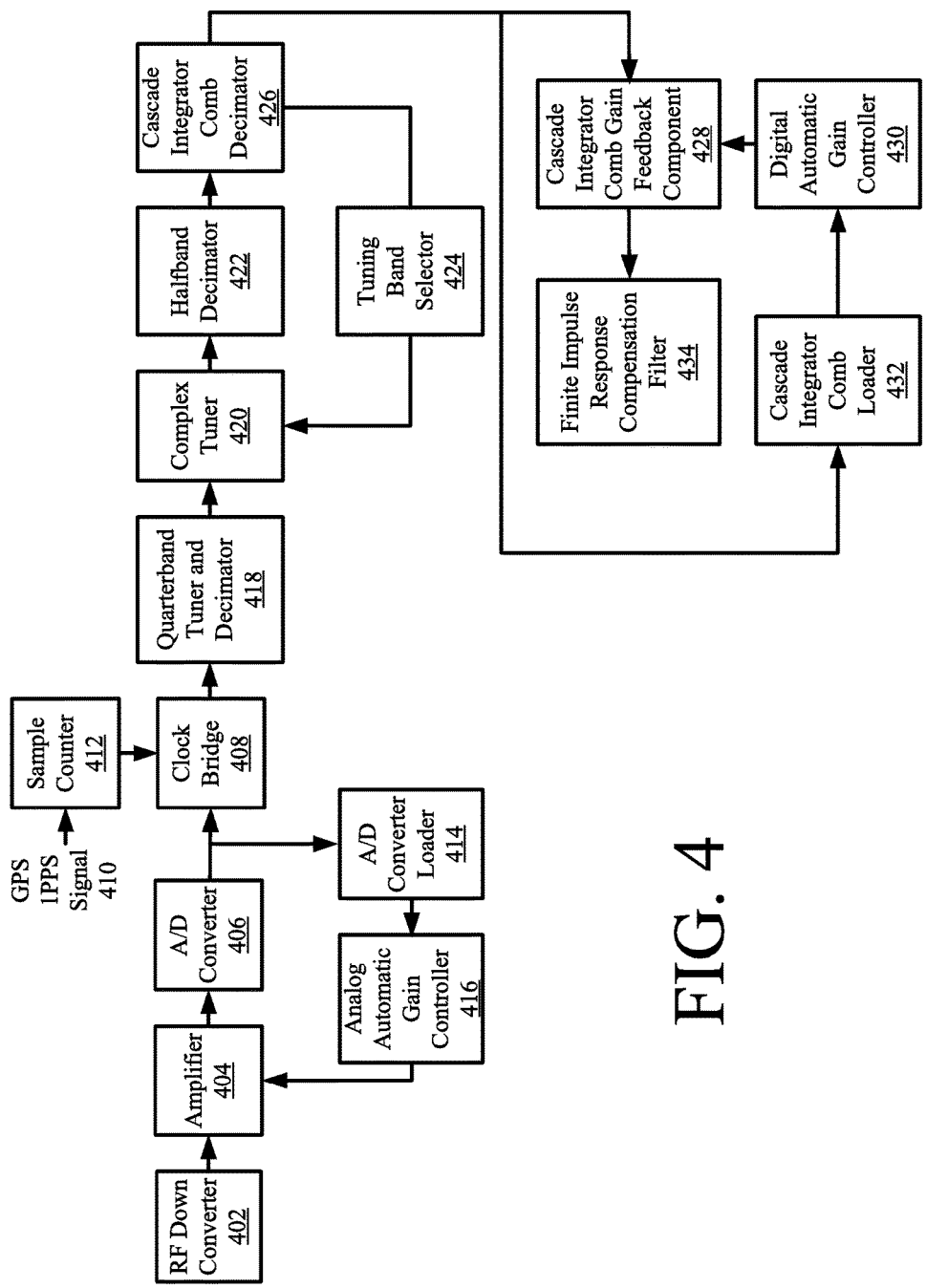
FIG. 4 comprises a detailed block diagram schematically illustrating the acquisition operations of a functional block shown in FIG. 3.

Referring now to FIG. 4, there is provided a more detailed block diagram schematically illustrating the acquisition operations of functional block 302. The acquisition operations generally involve converting an S-Band RF signal to baseband digital samples. Preceding an amplifier 404 is an RF down converter 402. At the RF down converter 402, at least a portion (e.g., 20 MHz) of the S-Band RF signal is pre-selected and down-converted into an IF signal (e.g., a 70 MHz IF signal). In the amplifier 404, amplification (e.g., a 30 dB amplification) is performed to boost the signal power closer to an input level range of an A/D converter 406. Further gain is available preceding the A/D converter 406.

The sample rate of the A/D converter 406 may be selected (e.g., 100 MHz) to allow direct digitization of the IF band pass filtered signal (e.g., a 70 MHz IF band pass filtered 406 MHz band). The clock (e.g., a 100 MHz clock) and S-Band receiver are phase locked to a GPS time reference (e.g., a 10 MHz reference). The bandwidth of the RF block converter is selected to have a value (e.g., 20 MHz) so that the IF is under-sampled. The input to the A/D converter 406 is adjusted so that the total peak aggregate power into the A/D converter 406 is no more than 0 dBm. The samples will be passed through a clock bridge 408.

Figure 5:
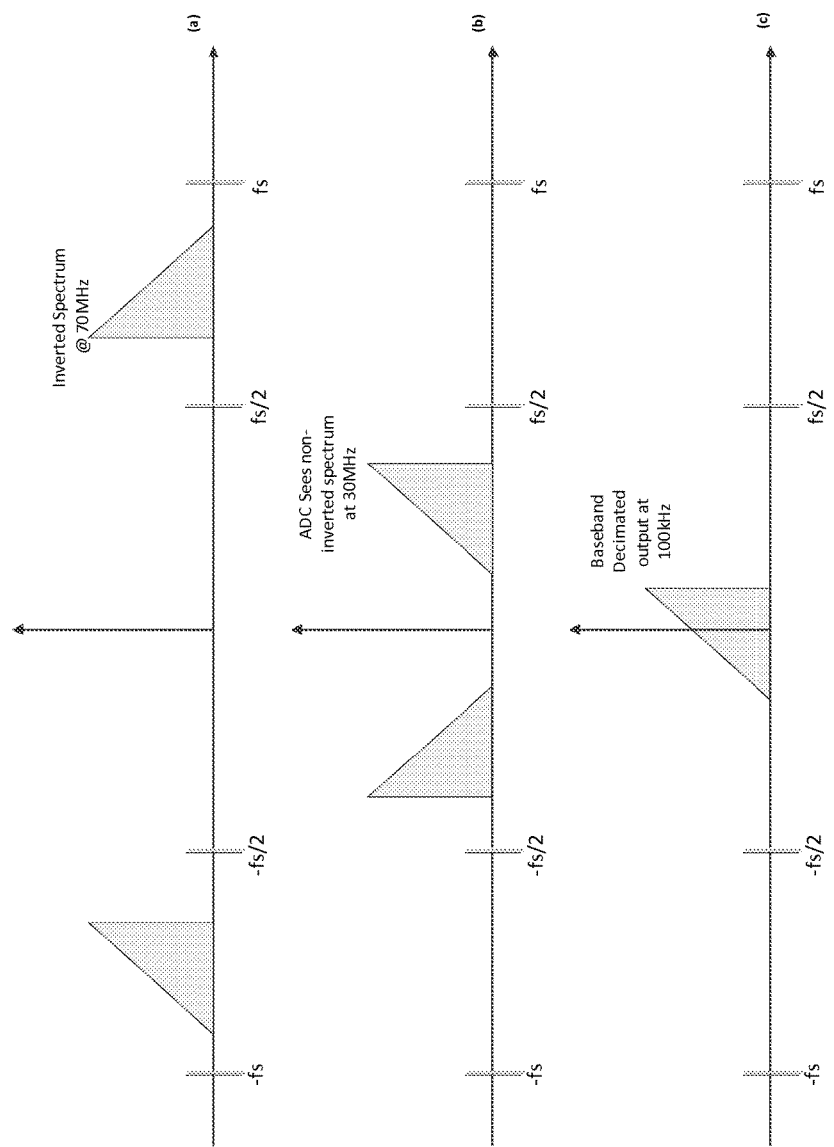
FIG. 5 provides a plurality of graphs that are useful for understanding the present invention.

The IF output spectrum of the S-Band receiver is inverted as shown by graph (a) of FIG. 5. When under-sampling at 100 MHz occurs, the A/D converter 406 sees a non-inverted spectrum shown by graph (b) of FIG. 5. After the filtering, down-converting and decimating stages, the output spectrum is band limited to less than 50 kHz and the sample rate is 100 kHz, as shown by graph (c) of FIG. 5.

The clock bridge 408 decouples the sample rate from a processing rate. This allows full 308 MHz operation of firmware signal processing. A GPS 1 PPS signal 410 is used to reset a sample counter 412 that marks the samples per second.

An A/D converter loader 414 provides an indication of the input energy to the A/D converter 406. If the A/D converter 406 is overloaded, an adjustment of the analog gain can be made to compensate therefore by an analog automatic gain controller 416.

After the samples pass through the clock bridge 408, the signal will be base banded and filtered to the DSSS channel bandwidth of a repeater. This will include signal bandwidth as well as guard band for a Doppler and beacon oscillator stability. As shown by functional blocks 418-434, the filtering and sample rate reduction can be accomplished by a quarter-band filter, complex tuner, a half-band decimator, a Cascade Integrator Comb ("CIC") decimator and decimating Finite Impulse Response ("FIR") compensation filter. The CIC gain feedback component 428 allows for a feedback gain to maximize the dynamic range of the output. The multiple stages of filtering provide an efficient method for base-banding a signal.

In some scenarios, components 402-406 and 410 are implemented in hardware. Components 408, 412, 414, 418-434 and 432 are implemented in firmware. Components 416, 424 and 430 are implemented in software. The present solution is not limited in this regard. All or some of the listed components can be implemented as hardware, software or a combination thereof.

Signal Detection

Figure 6:
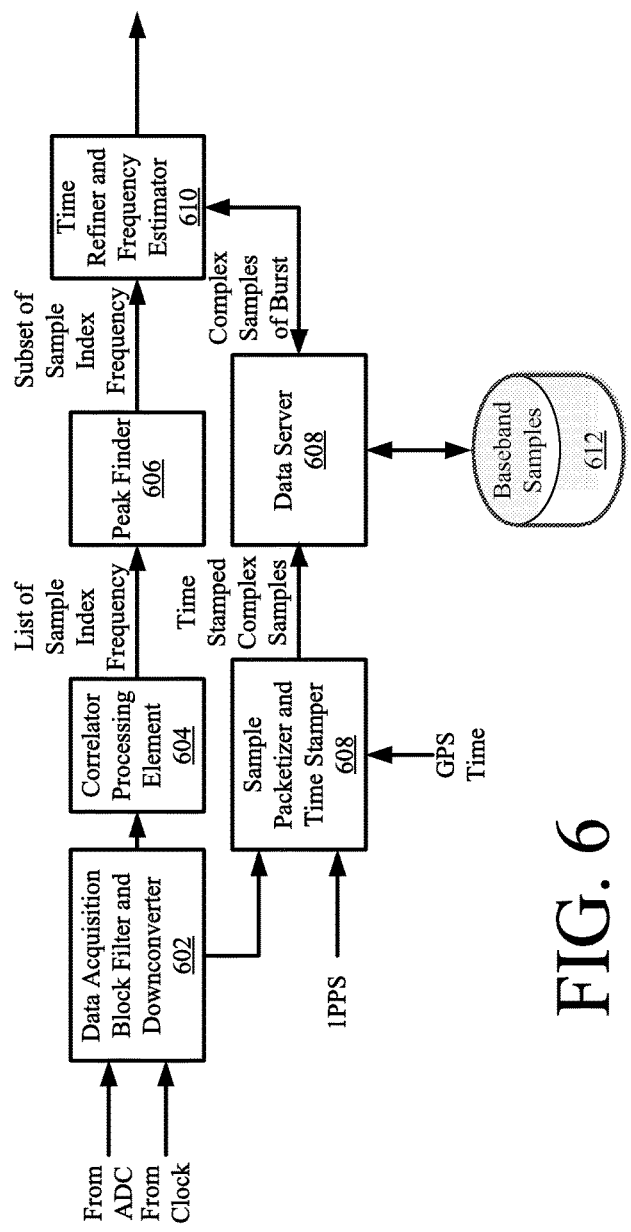
FIG. 6 comprises a detailed functional block diagram that is useful for understanding the signal detection operations employed herein.

Referring now to FIG. 6, there is provided a more detailed block diagram that is useful for understanding the signal detection operations employed herein. Generally, signal detection is broken down into the following two-steps: (1) identification of spread signals in noise through peak detection of the collapsed spread energy; and (2) assessment and refinement of the peak detections to reduce false alarms and increase probability of successful reception. The identification of signals in noise is performed in a correlator processing element 604 in firmware. In some scenarios, the correlator processing element 604 consists of an FFT based correlator which operates on a preamble of the signal. The correlator processing element 604 de-spreads the signal. The FFT coherently integrates and presents a Doppler influenced carrier frequency of an underlying signal.

The assessment and refinement of the peaks is done in software. When a burst is present, a set of detections may be present depending on the received signal strength. If multiple bursts are present, then multiple sets of detections may be present. A peak finder 606 reduces the clutter in detections to a set of discrete peaks. These peaks are used in conjunction with the identified complex spread samples to further refine the peak in frequency and time resolution.

A Coordinated Universal Time ("UTC") time is passed from software to a sample packetizer and timestamper 608 for association with the 1 PPS signal. The SDR's clock is synchronized to a local time server which guarantees millisecond accuracy to UTC. Once the UTC time is passed to the firmware, time-stamping will be good to ten (10) nanosecond accuracy.

In some scenarios, components 602, 604 and 608 are implemented in firmware. Components 606-612 are implemented in software. The present solution is not limited in this regard. Each of the components 602-612 can be implemented in hardware, software or a combination of both.

Correlator

Figure 7:
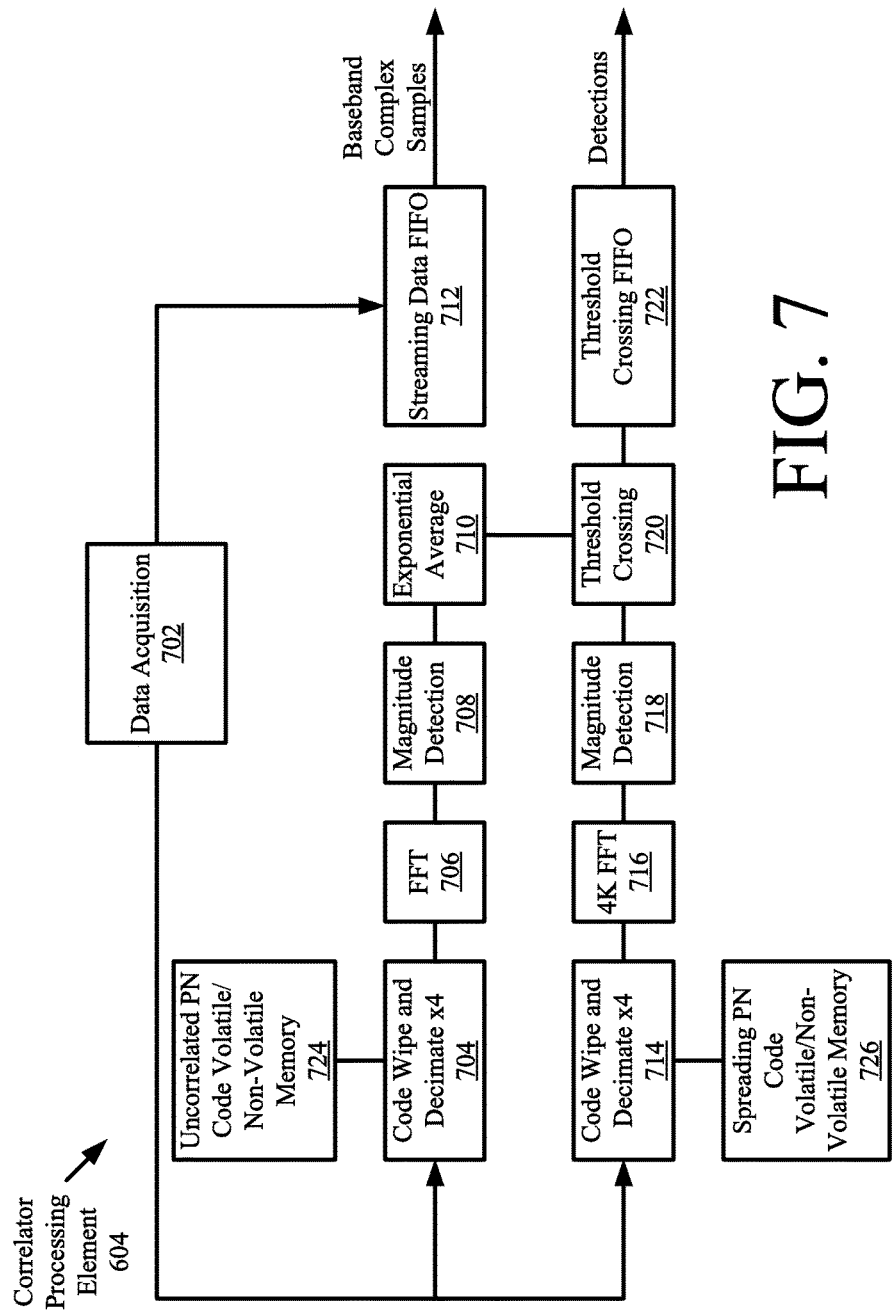
FIG. 7 comprises a detailed functional block diagram that is useful for understanding the correlator processing employed herein.

Referring now to FIG. 7, there is provided a more detailed block diagram that is useful for understanding the correlator processing element 604 employed herein. The correlator processing element 604 receives oversampled complex samples from a data acquisition function 702. The oversampled complex samples is passed to each of two (2) legs of the process 704-712 and 714-722, which will compute correlated signal plus noise and uncorrelated signal plus noise random variables. A spread signal will be oversampled by a factor of four (4). In each leg, each new sample is passed to one (1) of four (4) correlator blocks, which de-spread 4096-chip frames and coherently integrates 4-sample blocks. A modulated PN spreading code for the particular beacon is held in a volatile memory (e.g., a Random Access Memory ("RAM") 726. The modulated PN spreading code may be updated to other desired PN codes and spreading modulations. Another uncorrelated PN code is held in the volatile memory 724 for computation of an uncorrelated output. The resulting stream of 4096 values is passed through a 4096-point FFT 724 or 716, the output of which is magnitude detected as shown by functional block 708 or 718. The uncorrelated signal is exponentially averaged. This will be the noise estimate relative to which the signal detection is compared. When the signal exceeds a threshold value above the noise floor, a detection is forwarded to a First In First Out ("FIFO") operator (as shown by functional block 722) to be processed for de-spreading/demodulation. A detection consists of the UTC time to the epoch second and corresponding sample offset that the detection occurred and the frequency bin that the peak was present.

In some scenarios, a 4096 chip correlator is employed. This chip correlator will provide roughly 30 dB of gain to the input signal. This will be adequate for the DASS downlink under a variety of interference scenarios given the anticipated transmit power of a DSSS beacon.

Clustering

Detection peaks typically have time and frequency adjacent sub-peaks. The clustering function identifies these clusters and extracts the central peak from the cluster.

Refinement of Detection

Figure 8:
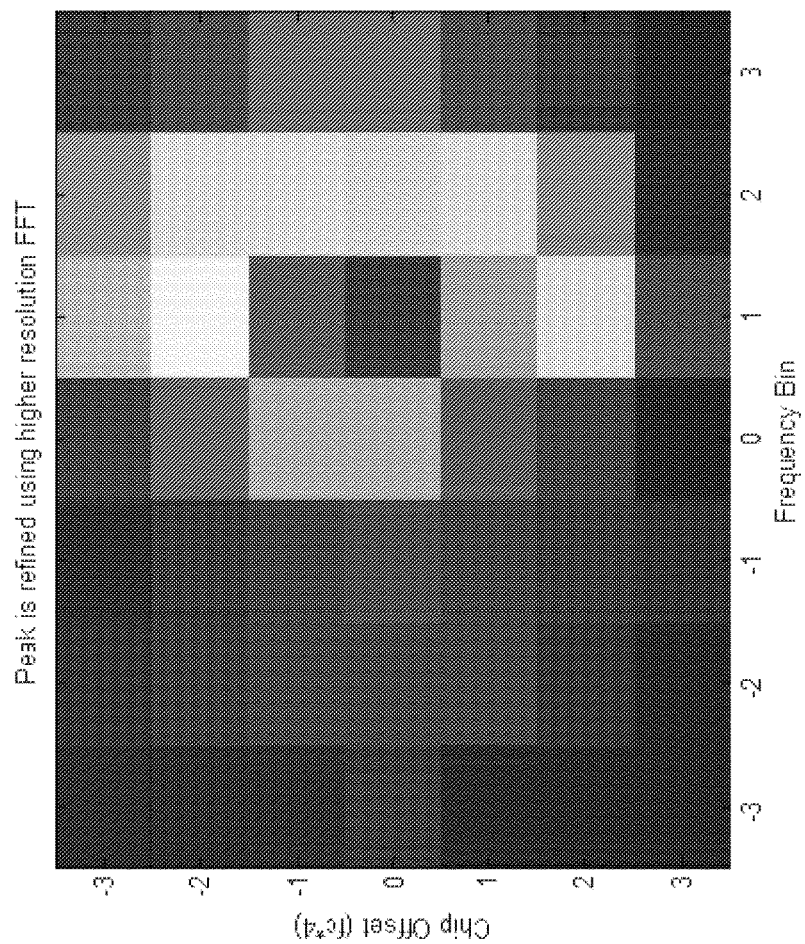
FIG. 8 provides a schematic illustration that shows peaks refined using a higher resolution FFT.

The central peaks are then used in conjunction with the complex data corresponding to the detected burst to refine the time and frequency estimations from the detector. These refinements are used as aids in the de-spreading/demodulation process. The samples are maintained in a circular buffer referred to as a data server. A request for an array of samples indexed into the circular buffer at a particular time offset is made to the data server. The array is a set of oversampled complex samples. The chip rate of the signal may be 38.4 k Chips Per Second ("CPS"). The data may be sampled at 153.6 k Samples Per Second ("SPS"), which is selected to be four (4) time the chip rate. Using the detected frequency, the data is down-converted and an FFT (e.g., a 16 k point FFT) is performed. From the peak detection bin, the adjacent frequencies are used to find the sub Hz centroid. For increased time resolution, the samples +3 to −3 offset from the peak are parabolically curve fit to find the sub sample time offset. These refinements will be applied to the detection time and frequency values. FIG. 8 provides a schematic illustration that shows peaks refined using a higher resolution FFT.

De-Spreading/Demodulation

Figure 9:
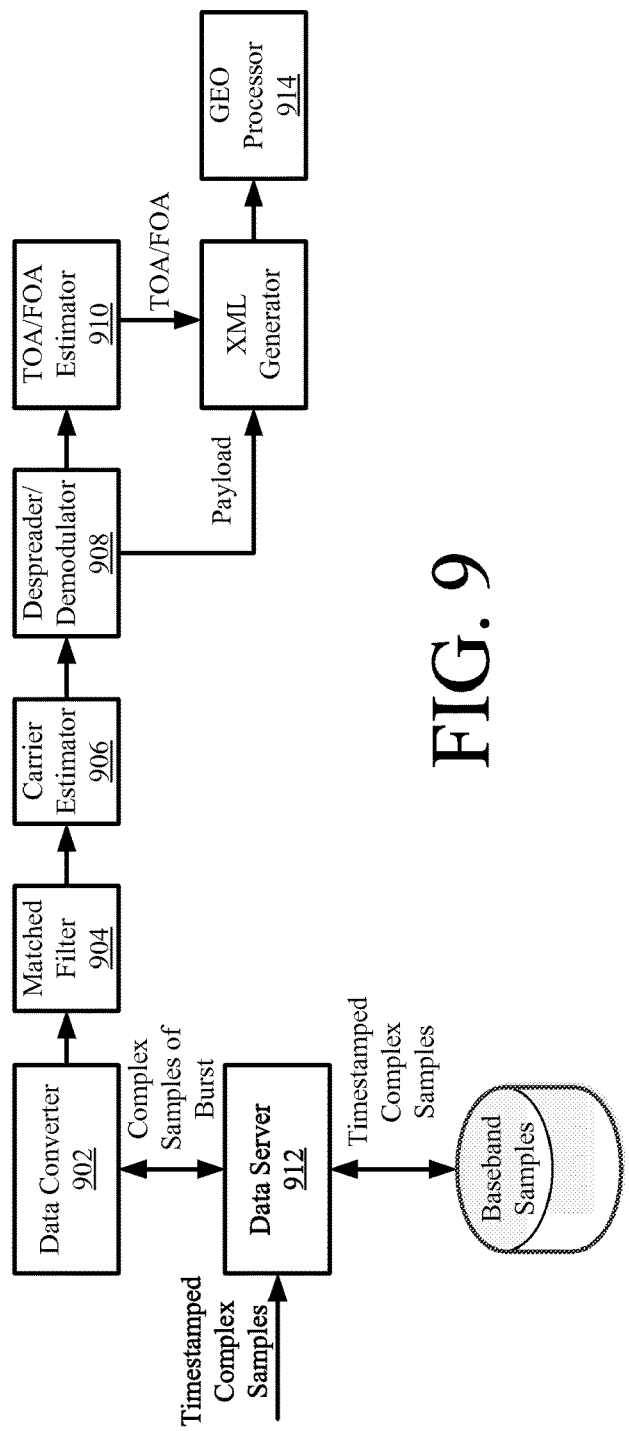
FIG. 9 comprises detailed functional block diagram that is useful for understanding the de-spreading and demodulation operation employed herein.

Using the refined frequency from the peak processing component, the burst's samples are ready to be de-spread and demodulated. FIG. 9 provides a functional block diagram for the de-spreading/demodulation operations performed herein. As shown in FIG. 9, the de-spreading/demodulation operations generally involve: down-converting operations performed by a down converter 902; matched filtering operations performed by a matched filter 904; carrier estimation operations performed by a carrier estimator 906; de-spread/demodulation operations performed by a de-spreader/demodulator 908; and TOA/FOA estimation operations performed by a TOA/FOA estimator 910.

The down-converting operations of the down converter 902 are used to remove most of the Doppler offset using the refined frequency from the peak processing component. The matched filtering operations of the matched filter 904 can be achieved using a lowpass filter to match the Root Raised Cosine ("RRC") filtering of the beacon signal. The carrier estimation operations of the carrier estimator 906 involve using the whole burst to estimate the carrier phase for each symbol in the preamble and curve fit the results. The result is used as an input to the de-spread operations of the de-spreader/demodulator 908.

In some scenarios, resample operations (not shown in FIG. 9) are performed by a re-sampler to reduce the rate of samples per chip. For example, the re-sampler may reduce the rate from four (4) samples per chip to three (3) samples per chip. The re-sampler may also provide early, late and on-time samples for use in the de-spread operations. The re-sampler may further receive an error signal from a chip tracker (not shown in FIG. 9) to adjust the resample rate. The resample offset can be used to interpolate the timestamp for each chip.

The de-spread operations of the de-spreader/demodulator 908 involve: applying a de-spreading sequence to the early, late, on-time and noise reference samples; accumulating the number of chips in a symbol (spread factor) to produce a reasonable SNR estimation; and sending this information to chip tracking and demodulation components.

Figure 10:
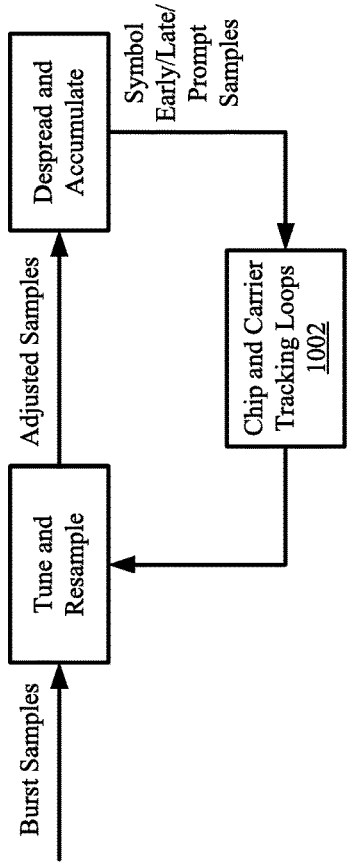
FIG. 10 comprises a schematic illustration illustrating tracking loop interaction with tuning and resampling.

The chip tracking may use the integrated early, late and on-time samples from the de-spread operations to provide an error signal to the re-sampler. A Delay Lock Loop ("DLL") error comes from taking early-late (or late-early). When phase locked, the on-time is at its peak value, and early and late is equal (difference or error is zero). When the timing is off, the samples slide to the left or right of the triangle causing an imbalance in early and late. The DLL computes a filtered error and adjusts the resampling frequency to correct the error. Residual phase of the on time sample is used to track and remove residual Doppler on the carrier. The residual Doppler values are saved to be used for refined FOA estimation. Timestamps of the first chip of each symbol are saved to be used for refined TOA estimation. Tracking loop interaction with tuning and resampling is illustrated in FIG. 10.

The demodulation operations of the de-spreader/demodulator 908 involve: taking the prompt accumulated samples from the tracking loops; making hard bit decisions; and forwarding the demodulated bits to an error correction component. The error correction can be achieved using a BCH decoder according to the parameters applied to the signal. The error correction is performed to correct bit errors. If the message payload is encrypted or is encoded for authentication, the applicable algorithm may be applied on the error corrected samples.

In some scenarios, all components except for the GEO processor 914 are implemented in software. The present solution is not limited in this regard. Each of the components shown in FIG. 9 can be implemented in hardware, software or a combination thereof.

Time and Frequency Tagging

One of the outputs of the chip and error tracking loops 1002 of FIG. 10 may be an array of timestamp samples from each symbol in the message. This set of samples is curve fit to calculate a refined TOA estimation. The frequency offsets provided by the tracking loop are also curve fit to calculate a refined FOA estimation.

Atmospheric and Dynamics

A further refinement to the TOA is accomplished by: determining the satellite position; computing the atmospheric and relativistic delay that affected the detected modulated carrier signal during transmission thereof; and applying the atmospheric and relativistic delay to the high accuracy TOA. The output of this process is a further refined TOA (e.g., a TOA with at least a 100 ns measurement accuracy).

Each of the DASS satellites has a unique group delay which affects the TOA at the ground station. The bias for each satellite is determined using a procedure to compute the group delay offsets. This delay is applied to the TOA prior to Geolocation processing.

Geolocation Processing

The output of the de-spreader/demodulator 908 is a packet of error corrected payload data with the corresponding TOA and FOA estimates. For each of the DSSS sub-systems (e.g., sub-systems 114-120 of FIG. 1), these packets will be stored in a server (e.g., sever 112 of FIG. 1). The packets are then associated in the GEO location processing device (e.g., device 160 of FIG. 1) and a solution is calculated.

Exemplary Methods For Determining A High Accuracy TOA

A high accuracy TOA is determined during a TOA measurement process. The input to the TOA measurement process is a coarse TOA. In some scenarios, the coarse TOA is determined by: capturing an RF signal at a downconverter; providing an analog down converted RF signal to an A/D converter; providing the digital signal to a sampler; generate a plurality of input samples by sampling the RF spectrum using the digital signal output from the A/D converter; and cross correlating the input samples (on a sample-by-sample basis) with samples of a local copy of a PN code (i.e., a code that represents the signal of interest or a replica of the signal of interest) to identify peaks. In some cases, Doppler effects need to be addressed via an FFT. The term "Doppler effect(s)", as used herein, refers to the change in frequency of a wave for an observer moving relative to its source. The cross correlation de-spreads the signal, and the FFT specifies where the peak is in frequency.

It is undesirable to process or further process every potential peak. Accordingly, a threshold is employed that represents a level above which a real detection is made. The thresholding provides a way to discriminate between noise that causes a false signal detection and noise with enough energy to be considered a signal. The thresholding involves determining a threshold crossing by comparing sample energy levels to the threshold. The sample associated with the threshold crossing is noted. The sample count relative to the time of day is known. This time of day represents the coarse TOA. The time resolution of the coarse TOA is not desirable in some scenarios. As such, additional operations are performed to improve the accuracy of the estimated TOA.

The input to the additional operations is the coarse TOA. The coarse TOA is used to determine which sample should be the first sample in subsequent down conversion operations. The sample associated with the coarse TOA is used as the first sample. All N−1 subsequent samples are also used in the subsequent down conversion operations, where N is an integer number selected to provide the desired resolution for a high accuracy TOA. The frequency of this set of N samples is then down converted to zero Hertz (0 Hz) to remove Doppler effects. The down conversion is done digitally via signal processing. The signal processing involves: multiplying a complex exponential using a frequency bin at which the signal detection was made; and moving the frequency of the detected signal to zero Hertz (0 Hz).

Figure 12:
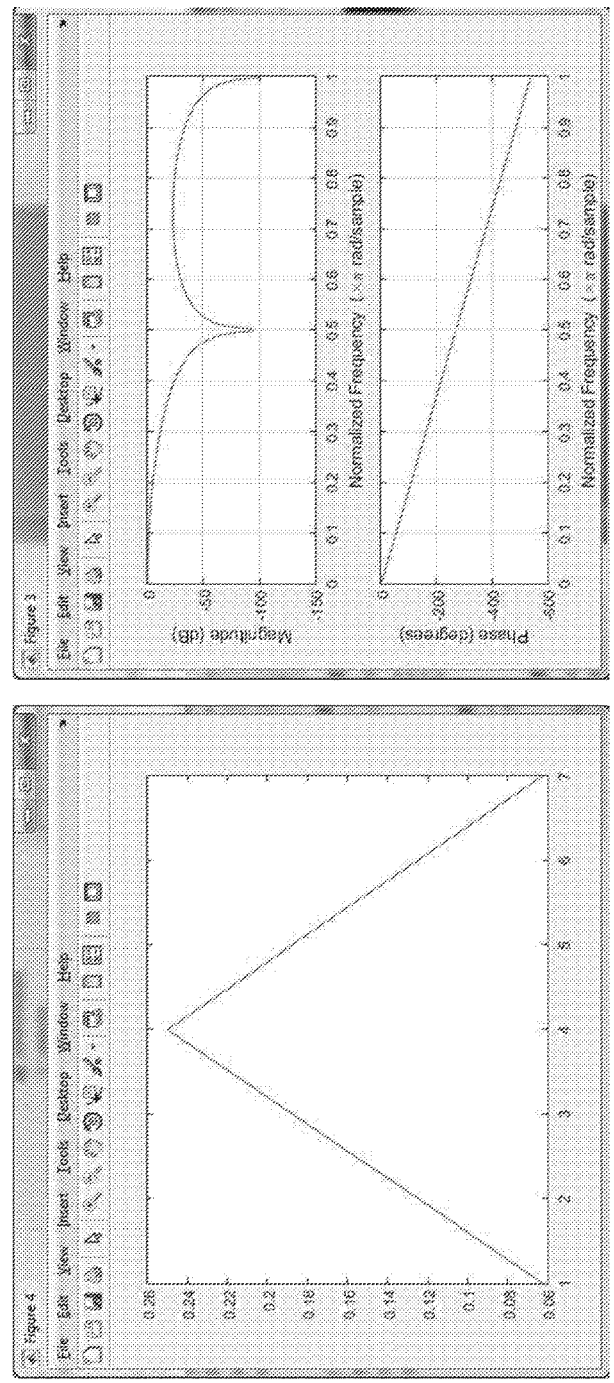
FIGS. 12 and 13 each comprise a plurality of graphs that are useful for understanding exemplary filtering operations employed for determining a TOA.
Figure 13:
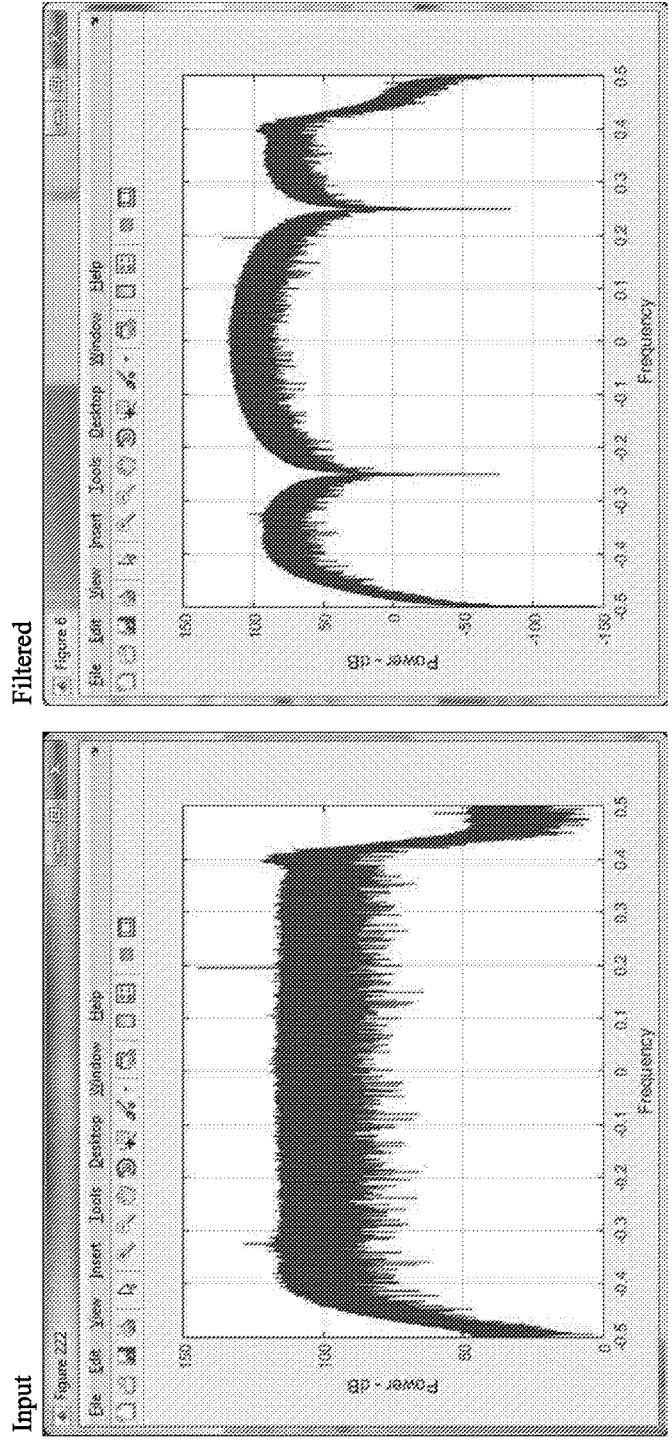

Thereafter, the signal (or samples) is(are) filtered to recreate the SinX/X shape of the original spread spectrum signal. Techniques for such filtering are well known in the art. Any known or to be known filtering technique for recreating a SinX/X shape of a signal can be used herein without limitation. In some scenarios, the filtering operations are Finite Impulse Response ("FIR") filtering operations. Exemplary coefficients or taps of the FIR filter are shown in FIG. 12. An exemplary input signal to the filtering operations is shown in the left graph of FIG. 14. An exemplary output signal of the filtering operations is shown in the right graph of FIG. 13.

Figure 14:
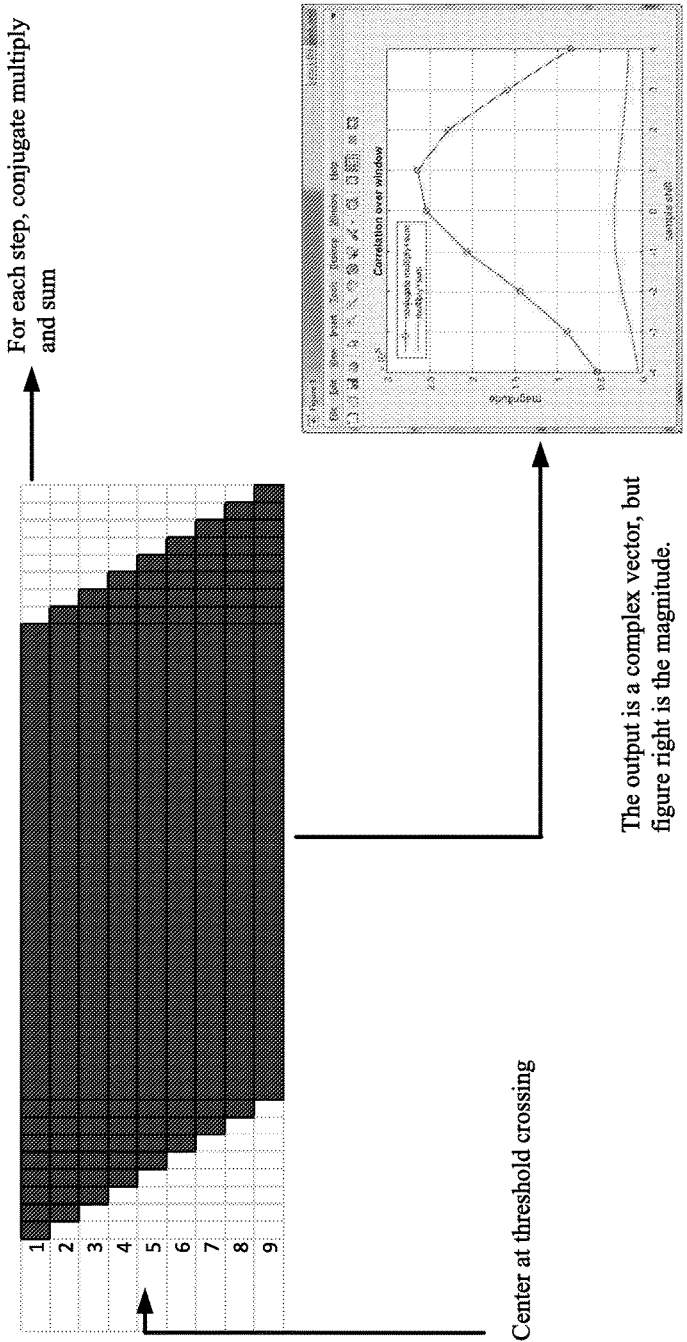
FIG. 14 comprises a schematic illustration that is useful for understanding exemplary cross correlation operations employed for determining a TOA.
Figure 15:
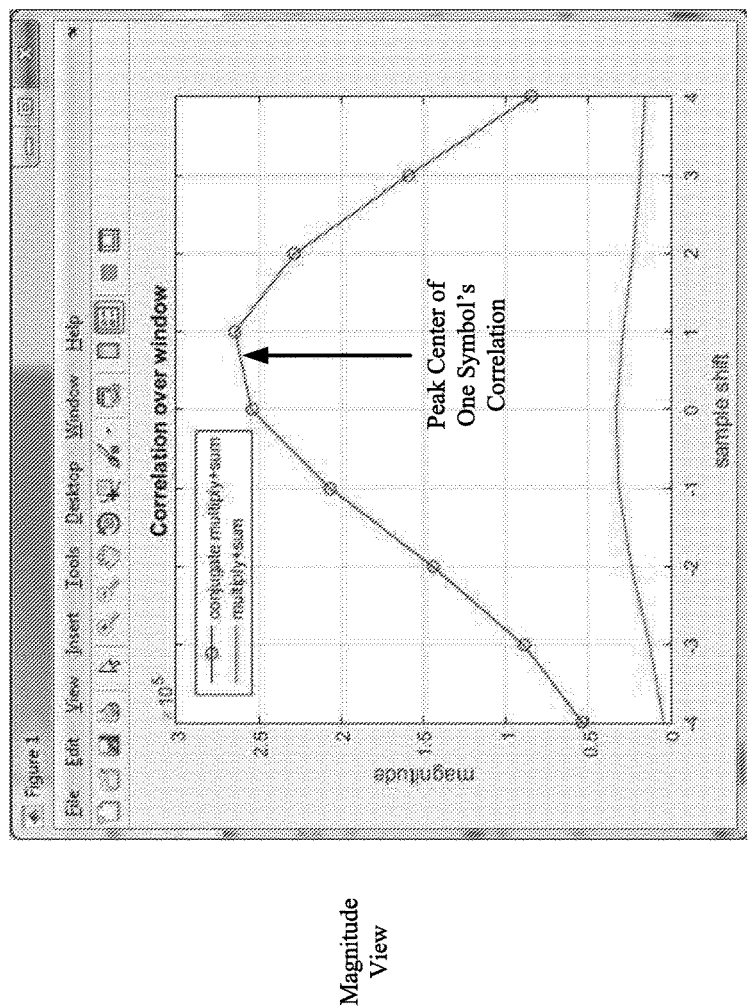
FIG. 15 comprises a graph plotting one symbol correlation over a sample window.
Figure 16:
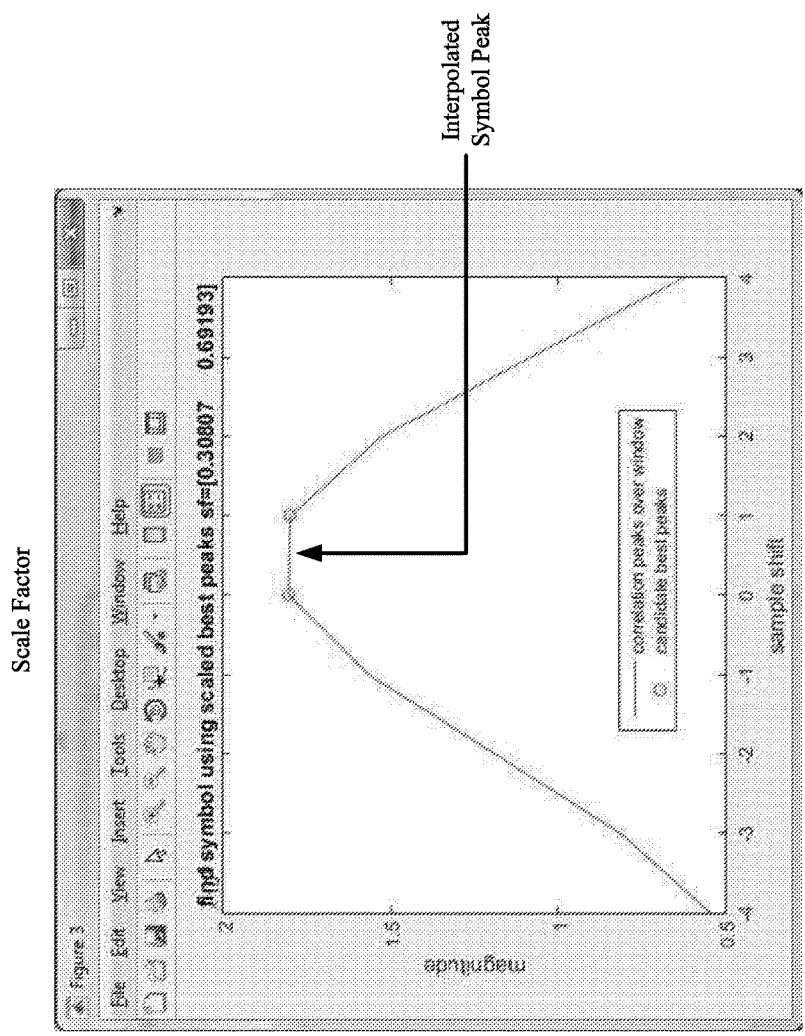
FIG. 16 comprises a graph that is useful for understanding an interpolated symbol peak.
Figure 17:
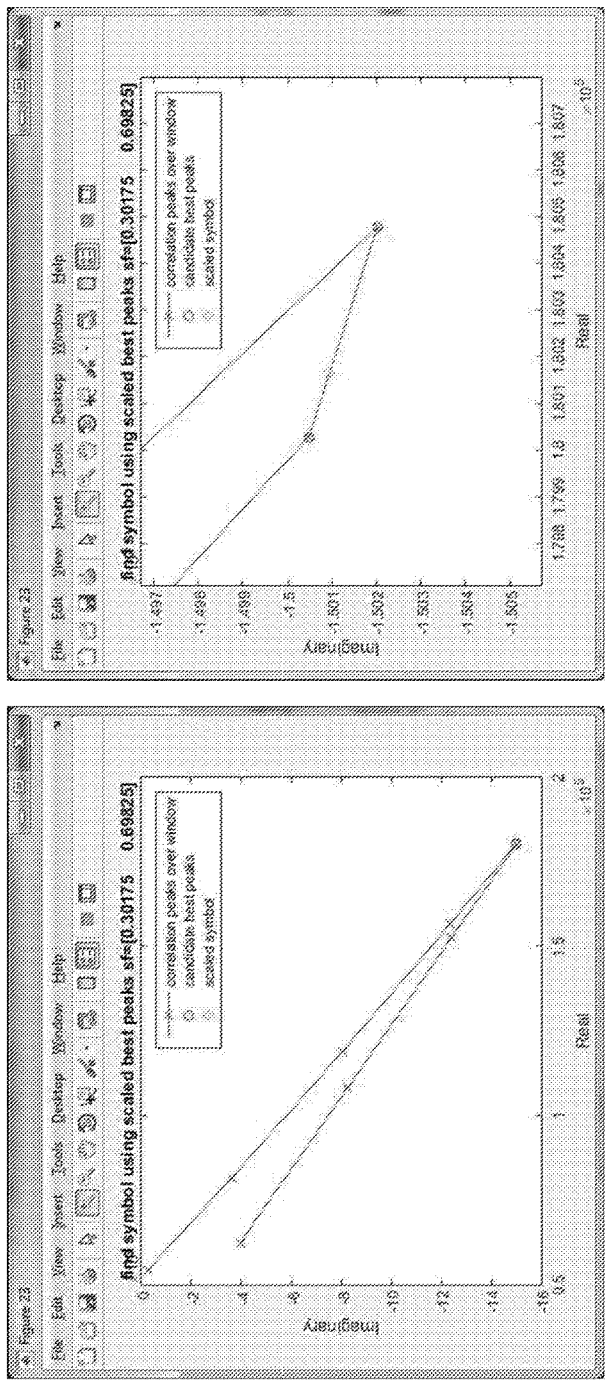
FIG. 17 comprises graphs that are useful for understanding how a symbol is found using best symbol peaks.

Next, the filtered samples are used in a cross correlation process. The cross correlation process involves taking each set of samples that represents one symbol from the local PN code. Each set of samples comprises an oversampled number of chips. Each symbol comprises a certain number chips that represent that symbol. In some cases, two hundred fifty six (256) chips represent a sample. By oversampling by four (4), one thousand twenty four (1024) samples for a window that represents one symbol. The thousand twenty four (1024) samples are cross correlated with the one thousand twenty four (1024) samples to obtain a cross correlation between the filtered samples and the samples of the PN code to obtain a correlation peak. FIG. 14 includes an upper left graph showing an overlay between the detected signal samples and the shifter version of the local PN code. The FIG. 14 also includes a bottom right graph showing the magnitude of the output from the cross correlation process. The correlation peak is then used to find the peak center of the pulse for each symbol of the detected signal. FIG. 15 includes a graph showing an exemplary peak center of one symbol's correlation.

Next, symbol estimation is performed. The symbol estimation involves: selecting the two peak values with the highest magnitude; and computing an average value for each symbol to obtain a set of estimated symbols. The set of estimated symbols is then further down converted to remove any remaining frequency offset. The set of estimated symbols are then used to obtain a value representing twice the center frequency. The center frequency is then further down converted to remove any trace of Doppler effects in the detected signal prior to determining the high accuracy TOA.

Figure 19:
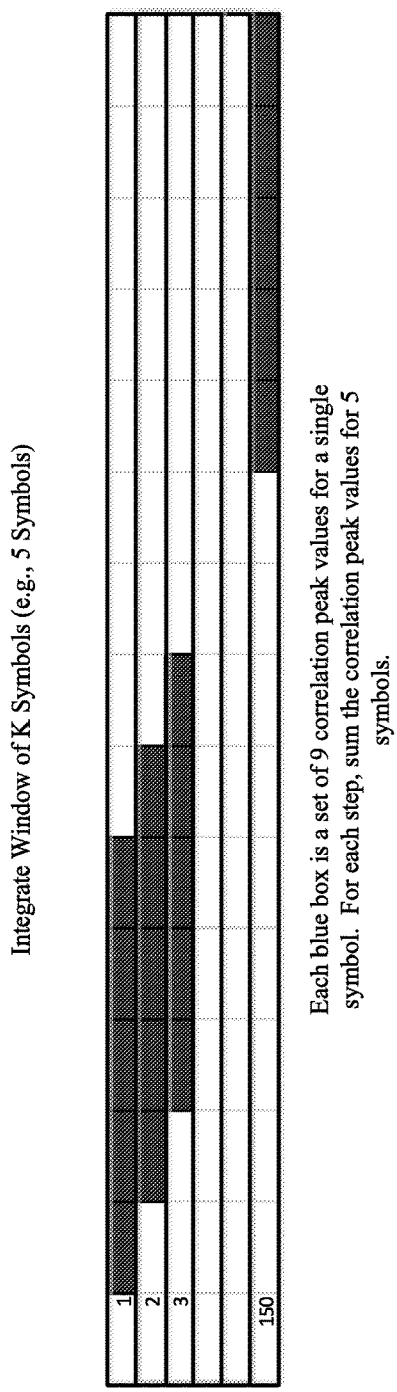
FIG. 19 comprises a schematic illustration that is useful for understanding how a set of K symbols is integrated.
Figure 20:
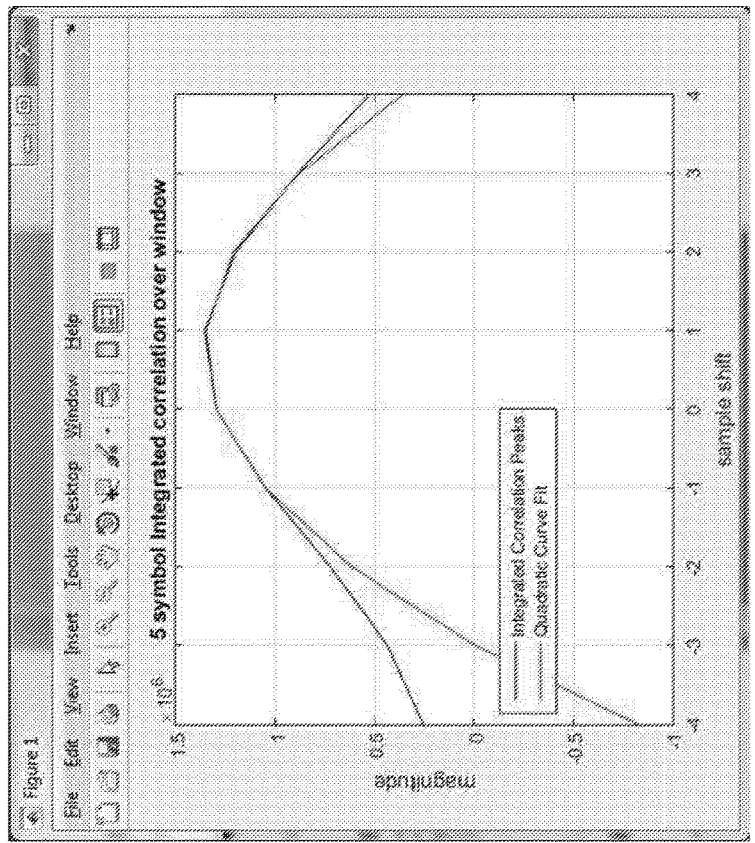
FIG. 20 provides a graph showing integrated peak values over K symbols.
Figure 21:
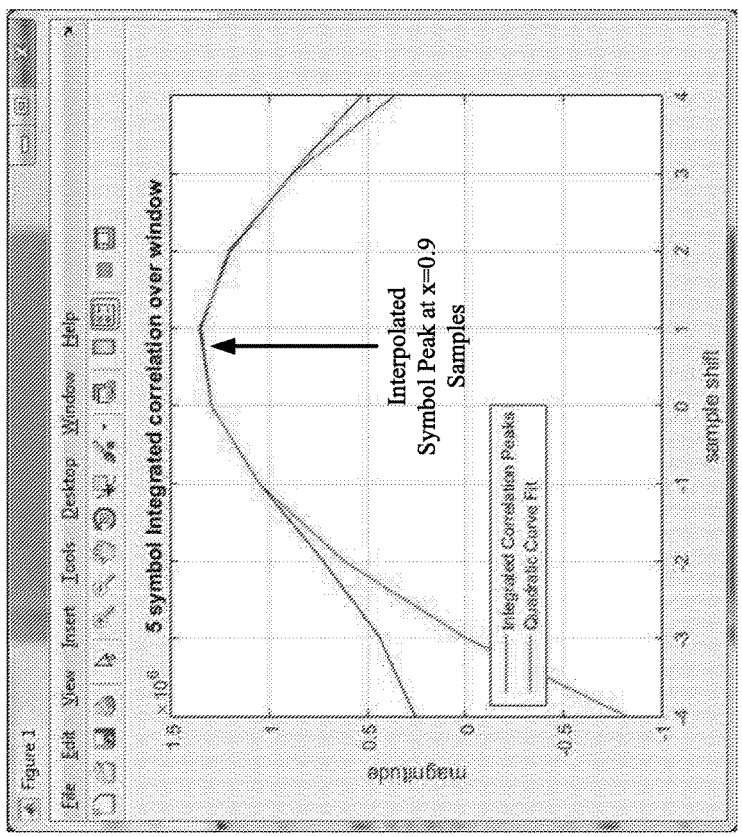
FIG. 21 comprises a graph showing integrated correlation peak values over K symbols.

Now that all traces of Doppler effects has been removed from the detected signal, a set of detected signal samples are cross correlated with a set of sample from the local PN code in much the same manner as described above. A set of W (e.g., 5) symbols are averaged (point-by-point) so that a better Signal to Noise Ratio ("SNR") measurement can be obtained. As should be understood, the signal is dilated or contracted in proportion to Doppler. Accordingly, W is an integer value selected for improving an SNR in view of the dilatation/contraction phenomenon. For example, the higher the Doppler Effect, the smaller the value of W. The lower the Doppler Effect, the larger the value of W. For each set of W symbols, a parabolic curve fit is performed so that an interpolated subsample frequency offset can be determined. FIG. 19 shows the results of one of the W symbol moving window calculation. These results are used to generate a parabolic curve fit shown in FIG. 20. The parabolic curve fit is used to look for a peak interpolated value of the maximum. FIG. 21 shows a graph plotting the peak interpolated values for each window of five symbols. As evident from FIG. 21, the sample offset increases over time so the signal is dilating (contracting). The TOA at this point is the intercept value computed from the parabolic curve fit. The original coarse TOA is refined with the intercept value. A high accuracy TOA is obtained by dividing the intercept value (i.e., a sample offset of a sample) by a sample rate.

Figure 11:
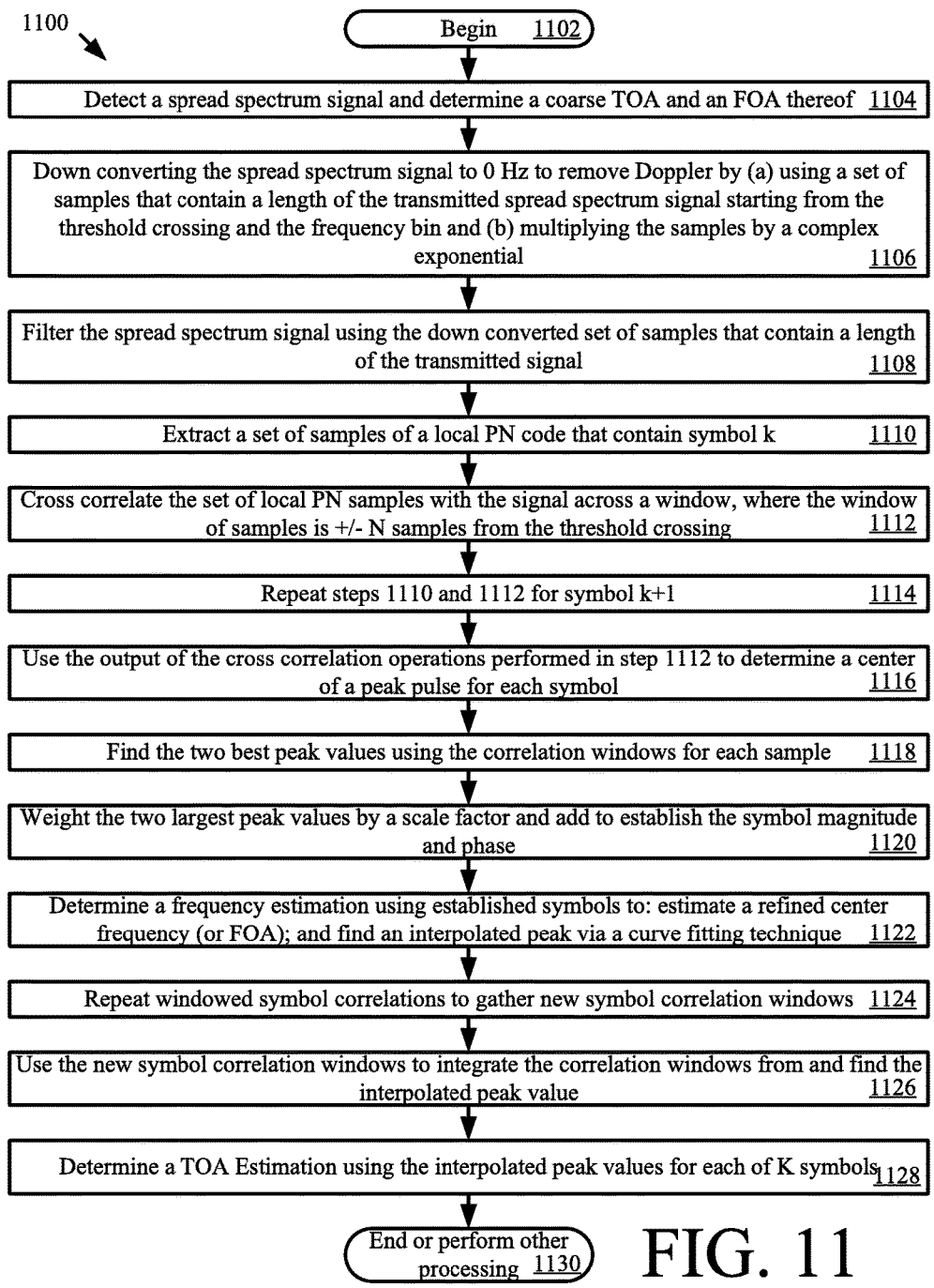
FIG. 11 comprises a flow diagram of an exemplary method for determining a Time Of Arrival ("TOA").

The above described process is shown schematically in FIG. 11. Referring now to FIG. 11, there is provided a flow diagram of an exemplary method 1100 for determining a high accuracy TOA. Method 1100 begins with step 1102 and continues with step 1104 where a spread spectrum signal is detected. Once the spread spectrum signal is detected, a coarse TOA is determined by: sampling an RF spectrum; maintaining a sampled copy of a PN code used in the spread spectrum signal; cross correlating the copy of the PN code with the input samples of the RF spectrum; performing an FFT on the output of the correlation to find a correlation peak (presence of the spread spectrum signal); and determining an energy threshold above which further process will occur. If the energy exceeds the threshold, then a note of the specific sample offset and frequency bin where the threshold crossing occurs is made. The sample offset and frequency bin are then used to determine the coarse TOA. Once the coarse TOA is determined, the high accuracy TOA measurement process begins.

The high accuracy TOA measurement process is described in relation to steps 1106-1128. These steps involve: down converting the spread spectrum signal to 0 Hz to remove Doppler by (a) using a set of samples that contain a length of the transmitted spread spectrum signal starting from the threshold crossing and the frequency bin and (b) multiplying the samples by the complex exponential; and filtering the spread spectrum signal using the down converted set of samples that contain a length of the transmitted spread spectrum signal. The filtering involves smoothing the spread spectrum signal to match that of the DSSS signal. In some scenarios, the filter length is seven (7), i.e., not quite two (2) chips at a sampling rate ("fs") equal to four (4) samples per chip.

Upon completing step 1108, method 1100 continues with steps 1110-1114. These steps involve using the filtered samples to: extract a set of samples of the local PN code that contain symbol k; cross correlate the set of local PN samples with the signal across a window; and repeating the extracting and cross correlating for symbol k+1. In some scenarios, the window is +/−N samples (e.g., 9 samples) from the threshold crossing. A symbol comprises 256 chips times 4 samples per chip (i.e., 1024 bits). The present solution is not limited to the particulars of this example. Each symbol's correlation yields a peak pulse. Therefore, in a next step 1116, the center of the peak pulse for each symbol is determined using the outputs of the cross correlation operations. FIG. 15 shows an exemplary peak center of a symbol's correlation.

In a next step 1118, the two best peak values are found using the correlation windows for each sample. The two largest peak values are then weighted in step 1120 by a scale factor. The scaled peak values are then added together to establish the symbol magnitude and phase.

Figure 18:
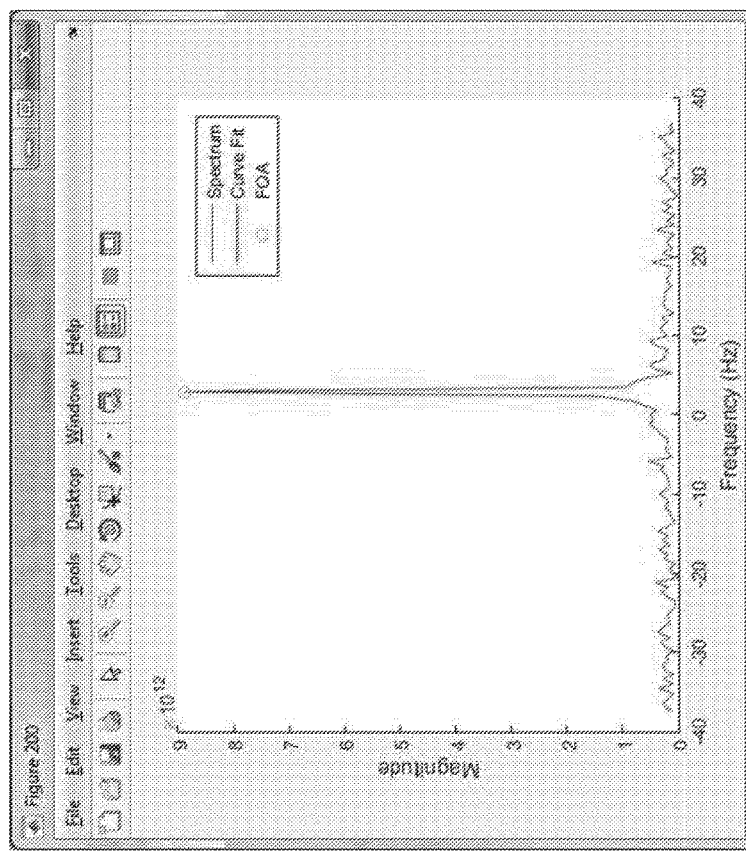
FIG. 18 comprises a schematic illustration that is useful for understanding how the frequency of a window of K symbols is determined.

When step 1120 is completed, step 1122 is performed. In step 1122, a frequency estimation is determined using established symbols. The established symbols are used to: estimate a refined center frequency; and find an interpolated peak. The refined center peak is estimated using an FFT across the first M symbols. In some scenarios, M equals one hundred twenty eight (128). In this case, an estimated refined center frequency is defined by the following mathematical equations.

$$xd=\text{symbols}(1:128)*\text{symbols}(1:128)$$

$$\text{faxis}=0.5*(\text{CHIP\_RATE}/\text{CHIPS\_PER\_SYMBOL})*[-64:63]/128$$

$$X=\text{FFTshift}(\text{abs}(\text{FFT}(xd)))$$

where X represents an estimated refined center frequency. The interpolated peak is found using a curve fitting technique. The curve fitting technique involves curve fitting a peak. A derivative of the curve fit equals zero (0) to find an FOA. FIG. 18 shows an exemplary FOA derived from the results of the curve fitting technique. Using the FOA, the signal is down converted to 0 Hz. The signal FOA is an FOA from a detector plus the refined FOA.

Thereafter, the windowed symbol correlations are repeated in step 1124 to gather new symbol correlation windows. The new symbol correlation windows are then used in step 1126 to integrate the correlation windows from and find that interpolated peak value over a window of K symbols (e.g., 5 symbols). Next, the process involves stepping by one symbol and integrating the next set of K symbols. FIG. 19 comprises a schematic illustration that is useful for understanding how a set of K symbols is integrated. FIG. 20 provides a graph showing integrated peak values over K symbols. FIG. 21 comprises a graph showing integrated correlation peak values over K symbols.

Figure 22:
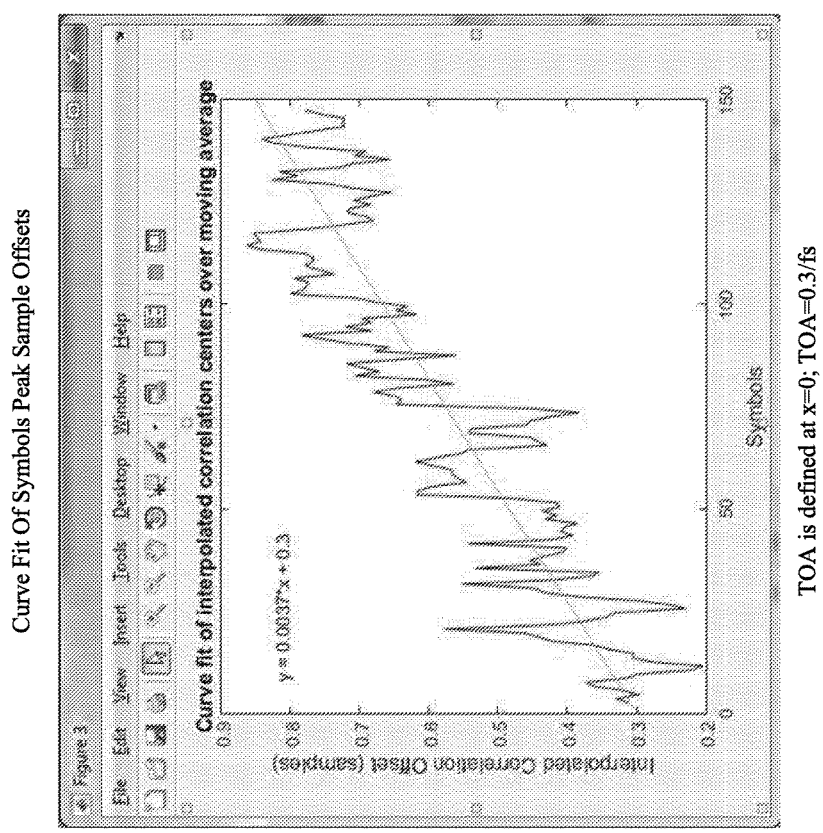
FIG. 22 comprises a graph showing a curve fit of symbols peak sample offsets.
Figure 23:
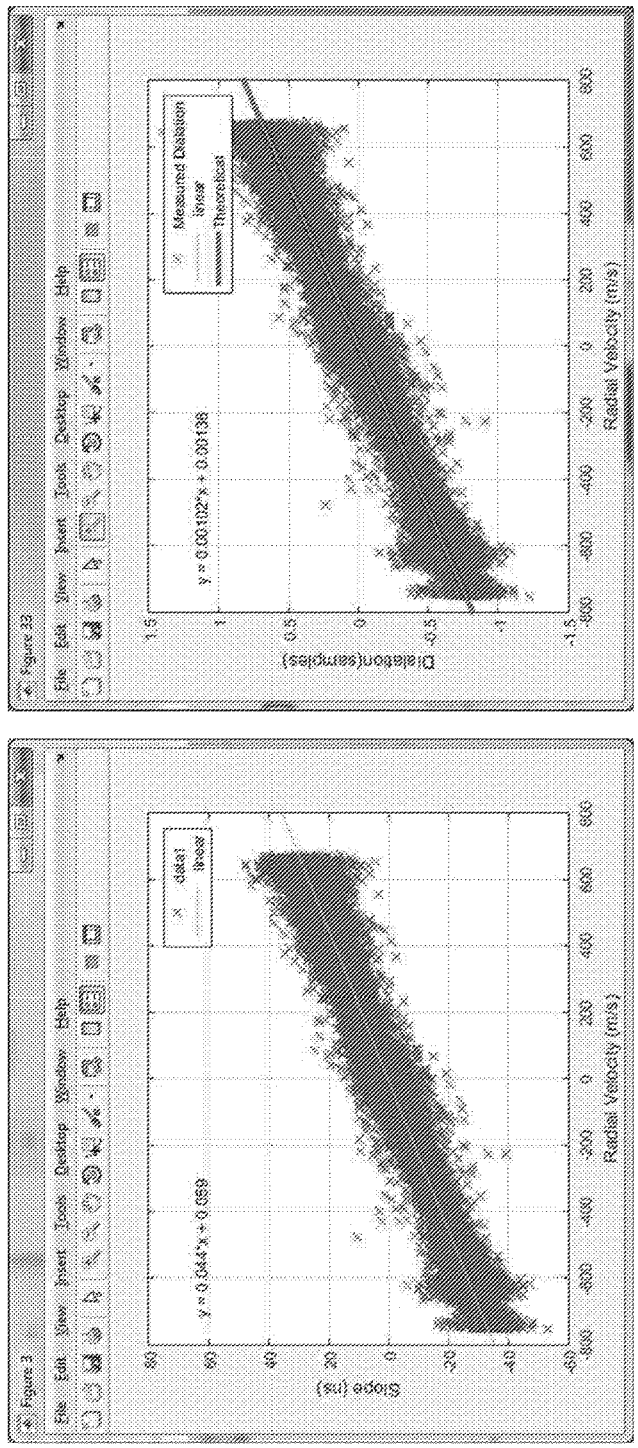
FIG. 23 comprises graphs that are useful for understanding time dilation and contraction.

In a next step 1128, a TOA estimation is determined. The TOA estimation is determined by: using the interpolated peak values for each of the K symbols moving average to plot sample (time offset) at peak values versus symbol number; and curve fitting the symbols versus sample offset. The curve fit is a function that defines the sample offset as it varies over time. The intercept value (x=0) is the function of a sample from the threshold crossing that the signal is detected. FIG. 22 comprises a graph showing a curve fit of symbol peak sample offsets. FIG. 23 comprises graphs that are useful for understanding time dilation/contraction.

Figure 24:
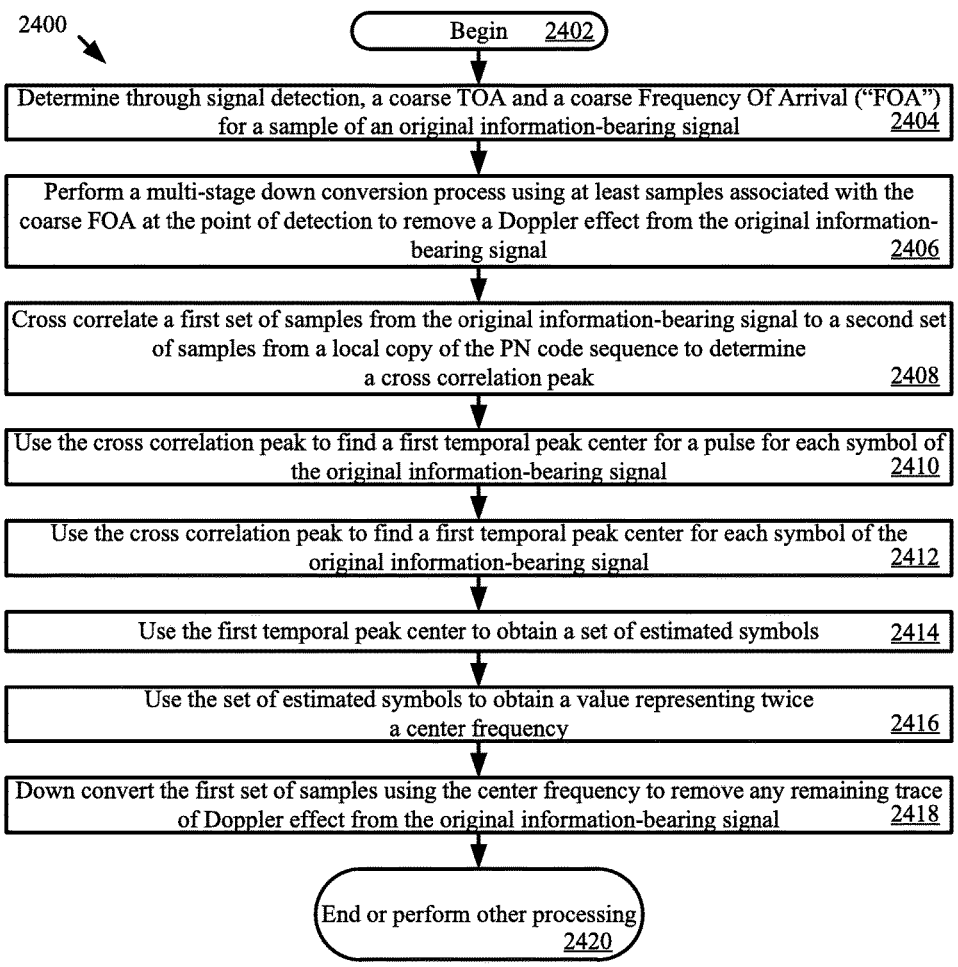
FIG. 24 is a flow diagram of an exemplary method for determining a high accuracy TOA.

Referring now to FIG. 24, there is provided a flow diagram of an exemplary method 2400 for determining a high accuracy TOA. Method 2400 begins with step 2402 and continues with step 2404 where a coarse TOA and a coarse FOA are determined, through signal detection, for a sample of the original information-bearing signal. In a next step 2406, a multi-stage down conversion process is performed using at least the samples associated with the coarse FOA at the point of detection to remove a Doppler effect from the original information-bearing signal. Then in step 2408, a first set of samples from the original information-bearing signal are cross correlated to a second set of samples from a local copy of the PN code sequence to determine a cross correlation peak. The cross correlation peak is used in step 2410 to find a first temporal peak center for a pulse for each symbol of the original information-bearing signal. The correlation peak is used in step 2412 to find a first temporal peak center for each symbol of the original information-bearing signal. The first temporal peak center is used in step 2414 to obtain a set of first estimated symbols. The set of first estimated symbols is used in step 2416 to obtain a value representing twice a center frequency. The first set of samples is down converted in step 2418 using the center frequency to remove any remaining trace of Doppler effect from the original information-bearing signal. Thereafter, step 2420 is performed where method 2400 ends or other processing is performed.

Figure 25:
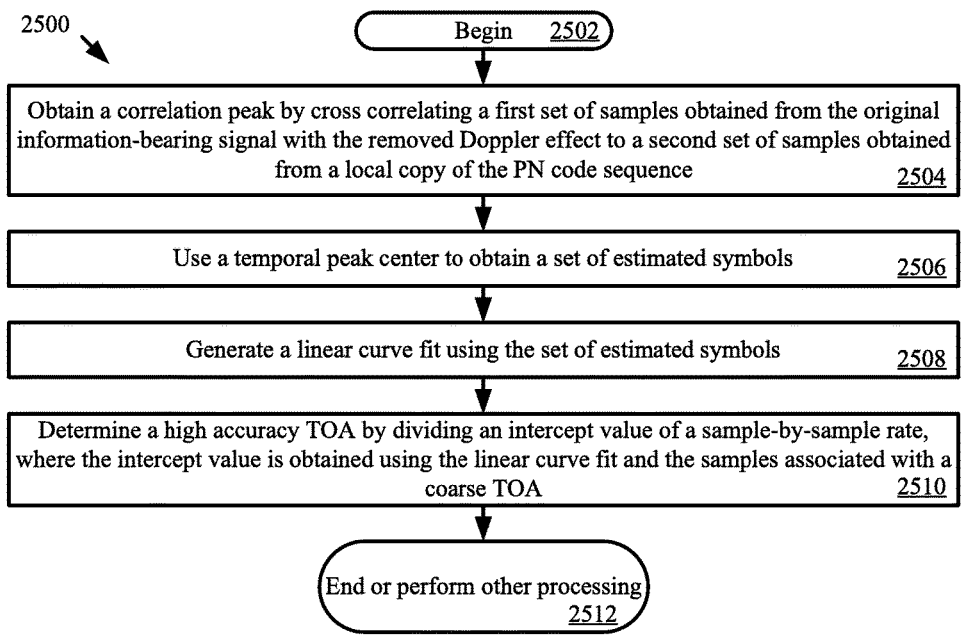
FIG. 25 is a flow diagram of an exemplary method for understanding a high resolution TOA process.

Referring now to FIG. 25, there is provided a flow diagram of an exemplary method 2500 for understanding a high resolution TOA process. The high resolution TOA process may be performed after completion of method 2400 discussed above.

Method 2500 begins with step 2502 and continues with step 2504 where a correlation peak is obtained by cross correlating a first set of samples obtained from the original information-bearing signal with the removed Doppler effect to a second set of samples obtained from the local copy of the PN code sequence. Next in step 2506, a second temporal peak center is used to obtain a set of estimated symbols. A curve fit (e.g. linear) is then generated in step 2508 using the set of estimated symbols. The high accuracy TOA is determined in step 2510 by dividing an intercept value of a sample-by-sample rate. The intercept value is obtained using the curve fit and the samples associated with the coarse TOA. Subsequently, step 2512 is performed where method 2500 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for determining an accurate location of a signal's source of transmission, comprising:
   demodulating, by a receiver of a communication device, a detected carrier signal modulated with a Pseudo Noise ("PN") code sequence to obtain an original information-bearing signal therefrom;
   computing, by the receiver, time delay offsets using correlations of PN code windows for each symbol of the original information-bearing signal;
   curve fitting the time delay offsets to construct a fitted curve that has a best fit to a series of data points defining the time delay offsets;
   extrapolating unknown time delay offsets using the fitted curve;
   determining, by the receiver, a high accuracy Time Of Arrival ("TOA") of the detected carrier signal using at least one of the time delay offsets and the unknown time delay offsets; and
   using, by the receiver, the high accuracy TOA to determine an accurate location of the original information-bearing signal's source of transmission.

2. The method according to claim 1, wherein the demodulating comprises:
   detecting a phase deviation from the detected carrier signal;
   removing the phase deviation from the detected carrier signal;
   performing early/late gate tracking to recover symbol timing phase of the detected carrier signal; and
   performing demodulation of the detected carrier signal using the recovered symbol timing thereof to extract the original information-bearing signal therefrom.

3. The method according to claim 2, wherein the high accuracy TOA is determined using the unknown time delay offsets that were extrapolated using the fitted curve.

4. The method according to claim 1, further comprising refining the high accuracy TOA by:
   determining a satellite position;
   computing an atmospheric and relativistic delay that effected the detected carrier signal during transmission thereof using the satellite position; and
   applying the atmospheric and relativistic delay to the high accuracy TOA so as to generate a refined TOA.

5. The method according to claim 4, further comprising using the refined TOA to determine an accurate location of the original information-bearing signal's source.

6. The method according to claim 1, wherein the high accuracy TOA is determined by:
   determining through signal detection, a coarse TOA and a coarse Frequency Of Arrival ("FOA") for a sample of the original information-bearing signal;
   performing a multi-stage down conversion process using at least samples associated with the coarse FOA at a point of detection to remove a Doppler effect from the original information-bearing signal;
   cross correlating a first set of samples from the original information-bearing signal with the removed Doppler effect to a second set of samples from a local copy of the PN code sequence to determine a cross correlation peak;
   using the cross correlation peak to find a first temporal peak center for a puke for each symbol of the original information-bearing signal;
   using the first temporal peak center to obtain a set of first estimated symbols;
   using the set of first estimated symbols to obtain a value representing twice a center frequency; and
   down converting the first set of sample using the center frequency to remove any remaining trace of Doppler effect from the original information-bearing signal.

7. The method according to claim 6, wherein a high resolution TOA process comprises:
   obtaining a correlation peak by cross correlating a third set of samples obtained from the original information-bearing signal with a removed Doppler effect to a fourth set of samples obtained from the local copy of the PN code sequence;
   using the second temporal peak center to obtain a set of second estimated symbols;
   generating a curve fit using the set of second estimated symbols; and
   determining the high accuracy TOA by dividing an intercept value of a sample-by-sample rate, where the intercept value is obtained using the curve fit and samples associated with the coarse TOA.

8. A system, comprising:
   a receiver comprising an electronic circuit configured to:
      demodulate a detected carrier signal modulated with a Pseudo Noise ("PN") code to obtain an original information-bearing signal therefrom;
      compute time delay offsets using correlations of PN code windows for each symbol of the original information-bearing signal;
      curve fit the time delay offsets to construct a fitted curve that has a best fit to a series of data points defining the time delay offsets;
      extrapolate unknown time delay offsets using the fitted curve;
      determine a high accuracy Time Of Arrival ("TOA") of the detected carrier signal using at least one of the time delay offsets and the unknown time delay offsets; and
      use the high accuracy TOA to determine an accurate location of the original information-bearing signal's source of transmission.

9. The system according to claim 8, wherein the demodulating comprises:
   detecting a phase deviation from the detected carrier signal;
   removing the phase deviation from the detected carrier signal;
   performing early/late gate tracking to recover symbol timing phase of the detected carrier signal; and
   performing demodulation of the detected carrier signal using the recovered symbol timing thereof to extract the original information-bearing signal therefrom.

10. The system according to claim 9, wherein the high accuracy TOA is determined using the unknown time delay offsets that were extrapolated using the fitted curve.

11. The system according to claim 8, wherein the high accuracy TOA is refined by: determining a satellite position;

computing an atmospheric and relativistic delay that effected the detected carrier signal during transmission thereof using the satellite position: and applying the atmospheric and relativistic delay to the high accuracy TOA so as to generate a refined TOA.

12. The system according to claim 11, wherein the refined TOA is used to determine an accurate location of the original information-bearing signal's source.

13. The system according to claim 8, wherein the high accuracy TOA is determined by:

determining, through signal detection, a coarse TOA and a coarse Frequency of Arrival ("FOA") for a sample of the original information-bearing signal;

performing a multi-stage down conversion process using at least samples associated with the coarse FOA at a point of detection to remove a Doppler effect from the original information-bearing signal;

cross correlating a first set of samples from the original information-bearing signal with the removed Doppler effect to a second set of samples from a local copy of the PN code sequence to determine a cross correlation peak;

using the cross correlation peak to find a first temporal peak center for a pulse for each symbol of the original information-bearing signal;

using the cross correlation peak to find a first temporal peak center for a pulse for each symbol of the original information-bearing signal;

using the first temporal peak center to obtain a first estimated symbols;

using the set of first estimated symbols to obtain a value representing twice a center frequency; and down converting the first set of samples using the center frequency to remove any remaining Doppler effect from the original information-bearing signal.

14. The system according to claim 13, wherein a high resolution TOA process comprises:

obtaining a correlation peak by cross correlating a third set of samples obtained from the original information-bearing signal with removed Doppler effect to a fourth set of samples obtained from the local copy of the PN code sequence;

using the second temporal peak center to obtain a set of second estimated generating a curve fit using the set of second estimated symbols; and determining the high accuracy TOA by dividing an intercept value of a sample-by-sample rate, where the intercept value is obtained using the curve lit and samples associated with the coarse TOA.

* * * * *